(12) United States Patent
Peng et al.

(10) Patent No.: US 8,189,076 B2
(45) Date of Patent: May 29, 2012

(54) METHOD FOR COMPENSATING IMAGE DATA

(75) Inventors: Shih-Yuan Peng, Taipei County (TW); Hsin-Te Wang, Nantou County (TW)

(73) Assignee: Altek Corporation, Hsinchu (TW)

( * ) Notice: Subject to any disclaimer, the term of this patent is extended or adjusted under 35 U.S.C. 154(b) by 388 days.

(21) Appl. No.: 12/573,548

(22) Filed: Oct. 5, 2009

(65) Prior Publication Data

US 2010/0302406 A1 Dec. 2, 2010

(30) Foreign Application Priority Data

May 27, 2009 (TW) .............................. 98117898 A

(51) Int. Cl.
*H04N 9/64* (2006.01)

(52) U.S. Cl. .................... 348/248; 348/245; 348/254

(58) Field of Classification Search .................. 348/241, 348/242, 243, 244, 245, 246, 247, 248, 249, 348/250, 251, 225.1, 254
See application file for complete search history.

(56) References Cited

U.S. PATENT DOCUMENTS

| | | | | |
|---|---|---|---|---|
| 3,971,065 A * | 7/1976 | Bayer | ............................ | 348/276 |
| 5,420,644 A * | 5/1995 | Watanabe | ..................... | 348/588 |
| 5,661,521 A * | 8/1997 | Curtis et al. | .................. | 348/249 |
| 7,733,393 B2 * | 6/2010 | Yoshida et al. | ............... | 348/249 |
| 7,982,785 B2 * | 7/2011 | Kinoshita et al. | ............. | 348/248 |
| 2006/0152607 A1 * | 7/2006 | Noguchi | ........................ | 348/248 |
| 2006/0274173 A1 | 12/2006 | Yoshida et al. | | |
| 2007/0242145 A1 | 10/2007 | Hazelwood et al. | | |
| 2008/0074513 A1 * | 3/2008 | Noguchi | ....................... | 348/243 |

FOREIGN PATENT DOCUMENTS

TW 200707327 2/2007
WO 2006123828 A1 11/2006

* cited by examiner

*Primary Examiner* — Aung S Moe
*Assistant Examiner* — Chriss Yoder, III
(74) *Attorney, Agent, or Firm* — Morris Manning & Martin LLP; Tim Tingkang Xia, Esq.

(57) ABSTRACT

A method for compensating image data is adapted for an image sensor. The image sensor has a plurality of photo sensors arranged in an effective region and an optical black region. The method for compensating image data includes a plurality of monochromatic light representative values $S_i$ corresponding to pixel positions i is extracted from the photo sensors of the optical black region; a plurality of monochromatic image intensity values $V_O$ is extracted from the photo sensors of the effective region; the monochromatic light representative values $S_i$ are converted respectively to a plurality of monochromatic compensation values $f(S_i)$; and compensated image data $V_F$ is output after compensating the monochromatic image intensity values $V_O$ respectively based on the pixel positions i and the corresponding monochromatic compensation values $f(S_i)$. Through the method for compensating image data, a smear effect in the effective region can be compensated effectively.

14 Claims, 25 Drawing Sheets

75

METHOD FOR COMPENSATING IMAGE DATA

CROSS-REFERENCE TO RELATED APPLICATIONS

This non-provisional application claims priority under 35 U.S.C. §119(a) on Patent Application No(s). 098117898 filed in Taiwan, R.O.C. on May 27, 2009, the entire contents of which are hereby incorporated by reference.

BACKGROUND

1. Field

The present invention relates to a method for compensating image data, and more particularly to a method for carrying out smear reduction or removal for image data received by an image sensor of a digital camera.

2. Related Art

An image sensor applied in a digital camera is often a charge-coupled device (CCD). The image sensor may produce a smear effect adjacent to a corresponding high-light object when sensing a picture of objects of high brightness. FIG. 1 is a schematic view of an image data with the smear effect presented when an image sensor receives a picture of objects of high brightness. Referring to FIG. 1, the image sensor 90 comprises a plurality of photo sensors 92 arranged in an array. When the photo sensors 92 sense a picture of objects of high brightness, object smear pixels 94 and stripe smear pixels 96 appear on the photo sensors corresponding to the objects of high brightness. The object smear pixels 94 and stripe smear pixels 96 lead to the smear effect.

To solve the smear problem, the industry has proposed several solutions, for example, US Patent No. 2006/0274173 A1 published on Dec. 7, 2006 (the patent family of this patent includes Taiwan Patent Publication No. 200707327, PCT WO/2006/123828, and so on), which is entitled "Digital Camera Comprising Smear Removal Function". It can be seen from the abstract thereof that the disclosed technical solution is that a horizontal evaluation data generation section computes an average value of pixel signals of a vertical optical black region based on arbitrary pixel data of a horizontal optical black region, while a vertical evaluation data generation section computes an average value of pixel signals of the vertical optical black region based on arbitrary pixel data of the vertical optical black region, and the average values are output to an evaluation section respectively. The evaluation section outputs a gain value to a computation section based on a difference of the two transmitted average values. A smear information memory stores the pixel signals of a certain row of the vertical optical black region. The computation section multiplies the pixel data stored in the smear information memory by the transmitted gain value, and subtracts the multiplied pixel data from the pixel data shot by the charge-coupled device (CCD). Therefore, a photography apparatus and program and a smear removal apparatus are implemented, which can determine whether to perform the smear removal and an intensity of the smear removal based on the condition of the smear.

In addition, US Patent Application No. 2007/0242145 published on Oct. 18, 2007, entitled "Smear Reduction In CCD Images", also disclosed a technology for removing the smear effect in CCD images. This application mainly utilizes a signal change rate in a smear region as the basis for determining a smear region boundary (through comparison with a predetermined value). After the boundary is decided, an adjacent pixel deduction method or an interpolation method is employed to compensate the effective pixels corresponding to the smear region.

Although the above two methods for removing smear can achieve the purpose, they still have the following problems: (a) after compensation, the pixels in the smear region (that is, within the boundary) are artifact and distorted, (b) the compensation effect of the smear region is not smooth enough, and (c) the compensation of a monochromatic high light (for example, pure red, pure blue, pure green) is distorted.

SUMMARY

In view of the above, the present invention provides a method for compensating image data, which compensates image data received by an image sensor. The method not only compensates pixels with smear at smear positions effectively, but also considers factors such as avoiding artifact, protecting regions that are not suitable for compensation, and smoothness of compensation, thereby solving the above problems.

The method for compensating image data of the present invention is adapted for an image sensor, which converts a light transmitted from a scene to image data, and has a plurality of photo sensors arranged in an effective region and an optical black region. The method for compensating image data comprises:

A plurality of monochromatic light representative values $S_i$ corresponding to pixel positions i is extracted from the photo sensors of the optical black region; a plurality of monochromatic image intensity values $V_O$ is extracted from the photo sensors of the effective region; the monochromatic light representative values $S_i$ are converted respectively to a plurality of monochromatic compensation values $f(S_i)$; and a compensated image data $V_F$ is output after compensating the monochromatic image intensity values $V_O$ respectively based on the pixel positions i and the corresponding monochromatic compensation values $f(S_i)$.

The photo sensors are provided with a plurality of color filters, the color filters are arranged in a Bayer pattern, and the monochromatic light representative values $S_i$ comprise a red (R) light representative value, two green (Gr, Gb) light representative values, and a blue (B) light representative value.

The step of "converting the monochromatic light representative values $S_i$ respectively to a plurality of monochromatic compensation values" according to an embodiment is to acquire the monochromatic compensation values $f(S_i)$ by looking up the monochromatic light representative values $S_i$ in a look-up table according to a pixel intensity of each of the pixel positions i.

The monochromatic image intensity values $V_O$ comprise a red (R) image intensity value $V_R$, two green (Gr, Gb) image intensity values $V_{Gr}$, $V_{Gb}$, and a blue (B) image intensity value $V_B$.

The step of "converting the monochromatic light representative values $S_i$ respectively to a plurality of monochromatic compensation values" according to another embodiment comprises the following steps: a weight value Wi is obtained based on a larger value Vmax in the two monochromatic image intensity values $V_O$ of the same pixel position i in the same Bayer pattern; a plurality of adjusted representative values $S_i'$ are obtained by looking up the monochromatic light representative values $S_i$ in a look-up table according to a pixel intensity of each of the pixel positions i; and the monochromatic compensation values $f(S_i)$ are obtained by multiplying each of the adjusted representative values $S_i'$ respectively by the corresponding weight value $W_i$ based on the pixel position i.

The step of "obtaining a weight value Wi based on a larger value Vmax in the two monochromatic image intensity values $V_O$ of the same pixel position i in the same Bayer pattern" comprises the following steps: the larger value Vmax is compared and obtained in the two monochromatic image intensity values $V_O$ of the same pixel position i in the same Bayer pattern; and when the larger value Vmax is smaller than a first predetermined value ($V_T$), the weight value $W_i$ equals 1; otherwise, the weight value $W_i$ equals $(V_S-Vmax)/(V_S-V_T)$, in which $V_S$ is a maximum extracted value when the photo sensor is saturated.

The step of "outputting a compensated image data $V_F$ after compensating the monochromatic image intensity values $V_O$ respectively based on the pixel positions i and the corresponding monochromatic compensation values $f(S_i)$" according to a first embodiment is to subtract the monochromatic compensation value $f(S_i)$ from the monochromatic image intensity value $V_O$ corresponding to the pixel position i to obtain the compensated image data $V_F$ (that is, $V_F=V_O-f(S_i)$).

The step of "outputting a compensated image data $V_F$ after compensating the monochromatic image intensity values $V_O$ respectively based on the pixel positions i and the corresponding monochromatic compensation values $f(S_i)$" according to a second embodiment comprises the following steps: guard intervals of the pixel positions i are determined based on each of the monochromatic light representative values $S_i$; and except for the pixel positions in the guard intervals, the compensated image data $V_F$ is output after compensating the monochromatic image intensity values $V_O$ respectively based on the pixel positions i and the corresponding monochromatic compensation values $f(S_i)$.

The step of "determining guard intervals of the pixel positions i based on each of the monochromatic light representative values $S_i$" comprises: one of four monochromatic light representative value profiles is selected in sequence in the same Bayer pattern, when the monochromatic light representative value $S_i$ of the selected monochromatic light representative value profile is larger than a second predetermined value $V_{P1}$, a pixel position thereof is recorded as a first position; in the same selected monochromatic light representative value profile, whether monochromatic light representative values $S_i$ adjacent to the first position are smaller than a third predetermined value $V_{P2}$ is in sequence; in the same selected monochromatic light representative value profile, when the monochromatic light representative values $S_i$ are smaller than the third predetermined value $V_{P2}$, pixel positions thereof are recorded as a second position and a third position, and a monochromatic light selected interval is between the second position and the third position; and the monochromatic light selected intervals are joined to obtain the guard interval.

The step of "converting the monochromatic light representative values $S_i$ respectively to a plurality of monochromatic compensation values" according to still another embodiment comprises the following steps: a weight value $W_i$ is obtained based on the monochromatic image intensity values $V_O$; and the monochromatic compensation values $f(S_i)$ are obtained by multiplying the monochromatic light representative values Si respectively by the corresponding weight value $W_i$ based on the pixel positions i.

The step of "obtaining a weight value $W_i$ based on the monochromatic image intensity values $V_O$" comprises: when the monochromatic image intensity values $V_O$ are smaller than a first predetermined value ($V_T$), the weight value $W_i$ equals 1; otherwise, the weight value $W_i$ equals $(V_S-V_O)/(V_S-V_T)$, in which $V_S$ is the maximum extracted value when the photo sensor is saturated.

The step of "converting the monochromatic light representative values $S_i$ respectively to a plurality of monochromatic compensation values" according to yet another embodiment comprises the following steps: a weight value $W_i$ is obtained based on the monochromatic image intensity values $V_O$; a plurality of adjusted representative values $S_i'$ are obtained by looking up the monochromatic light representative values $S_i$ in a look-up table according to a pixel intensity of each of the pixel positions i; and the monochromatic compensation values $f(S_i)$ are obtained by multiplying the adjusted representative values $S_i'$ respectively by the corresponding weight value $W_i$ based on the pixel positions i (that is, $f(S_i)=S_i'*W_i$).

The step of "obtaining a weight value $W_i$ based on the monochromatic image intensity values $V_O$" comprises: when the monochromatic image intensity values $V_O$ are smaller than a first predetermined value ($V_T$), the weight value $W_i$ equals 1; otherwise, the weight value $W_i$ equals $(V_S-V_O)/(V_S-V_T)$, in which $V_S$ is the maximum extracted value when the photo sensor is saturated.

With the method for compensating image data of the present invention, each monochromatic color channel has a compensation value respectively at each pixel position i, enabling different color filters to be compensated more precisely when a smear effect occurs.

In addition, with the implementation of the present invention, when a bright object has a non-pure white light (for example, pure blue, red, green, or intensity of a certain color spectrum is higher), suitable compensation or no compensation may be selected optionally, thereby reducing a visual sense of artifact of the compensated image data.

With the implementation of the present invention, the compensation values for the photo sensors without the smear effect may be adjusted down suitably after operation. As for the photo sensors with little or partial smear effect, the compensation values may vary based on the degree that the photo sensors are affected by the smear. The compensation values for the photo sensors with the obvious smear effect are relatively large, or the photo sensors with obvious smear effect are protected and not compensated because the compensation may cause obvious artifact.

BRIEF DESCRIPTION OF THE DRAWINGS

The present invention will become more fully understood from the detailed description given herein below for illustration only, and thus are not limitative of the present invention, and wherein:

FIG. 18 is a schematic view of a monochromatic light representative value profile of the image data in FIG. 15A in an upper optical black region 12a;

DETAILED DESCRIPTION

Figure 1:
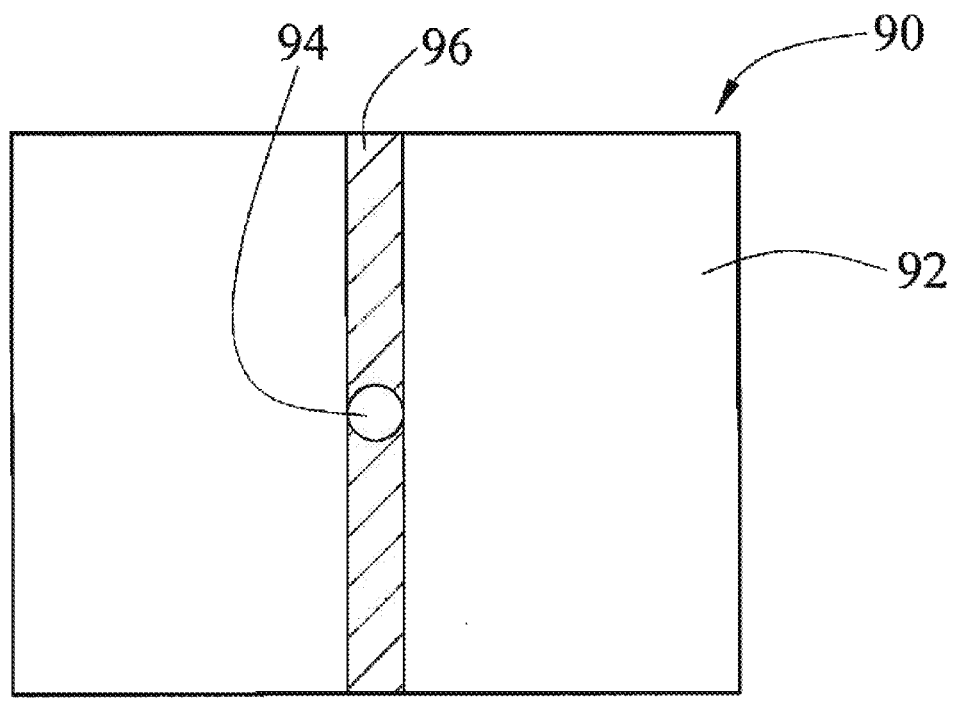
FIG. 1 is a schematic view of an image data with the smear effect presented when an image sensor receives a picture of objects of high brightness.
Figure 2A:
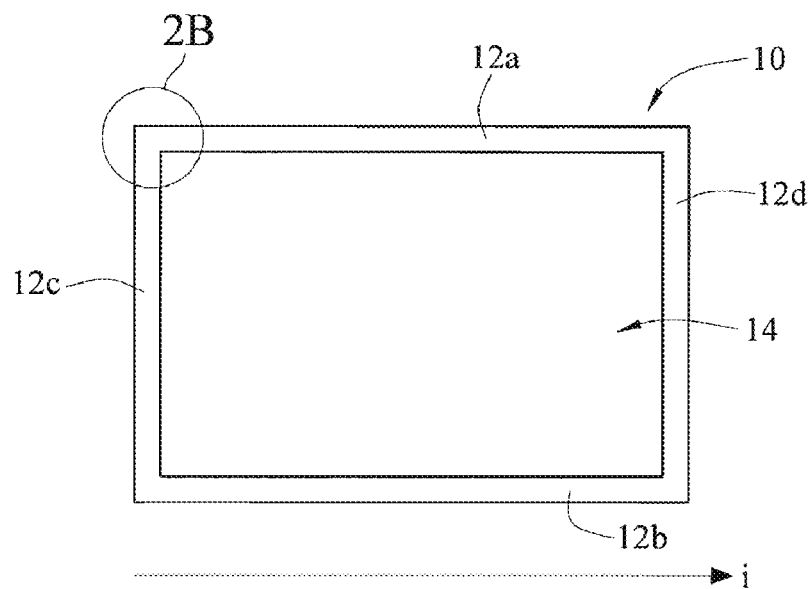
FIG. 2A is a schematic structural view of an image sensor according to an embodiment of the present invention.
Figure 2B:
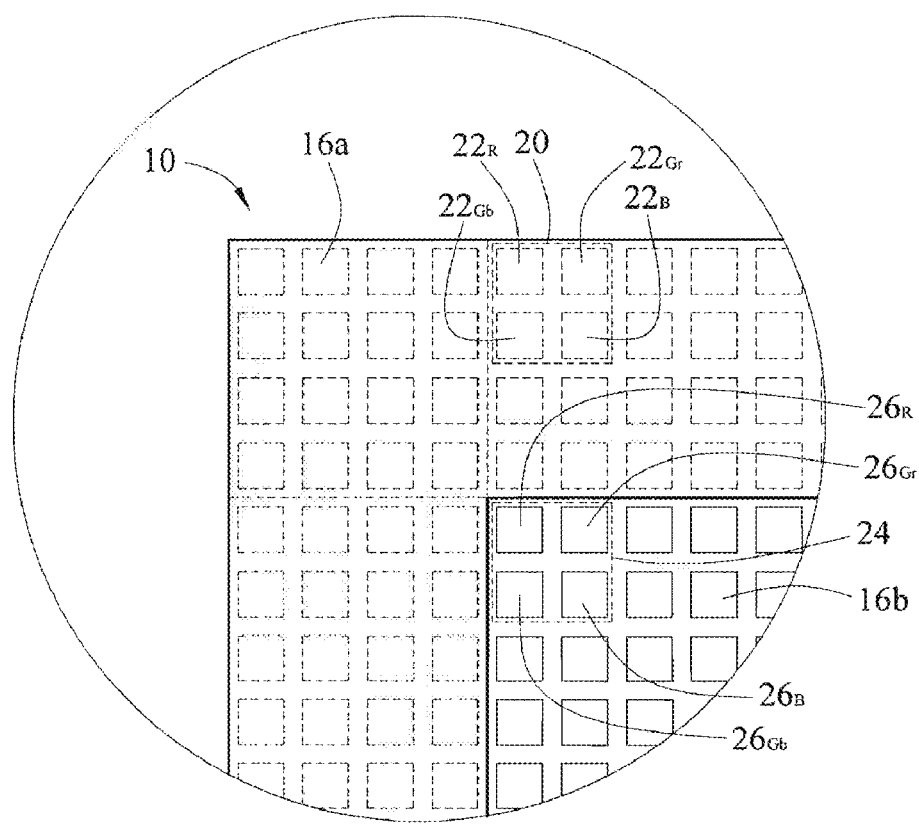
FIG. 2B is a partial enlarged view of FIG. 2A.

FIGS. 2A and 2B are schematic structural views of an image sensor according to embodiments of the present invention. Referring to FIGS. 2A and 2B together, an image sensor of a digital camera is taken as an example of the image sensor 10; however, the image sensor 10 is not so limited. The common image sensor 10 can be, but is not limited to, a charge-coupled device (CCD).

It can be seen from FIG. 2A, the image sensor 10 has optional black regions 12a, 12b, 12c, 12d and an effective region 14. Such optical black regions 12a, 12b, 12c, 12d are covered by an opaque frame, for example, a metal frame, so that they cannot receive light, or present image information of a shot scene. In other words, the periphery of the image sensor 10 is covered by the metal frame to form the optical black regions 12a, 12b, 12c, 12d. In contrast to the optical black regions 12a, 12b, 12c, 12d, the effective region 14 can receive directly the light transmitted from the shot scene and convert the light to corresponding image data (image signals). In actual applications, a lens and shutter are additionally disposed in front of the image sensor 10 to control the focal length and exposure time of the scene.

Generally, the optical black regions 12a, 12b, 12c, 12d are categorized as vertical optical black regions 12a, 12b and horizontal optical black regions 12c, 12d. The vertical optical black regions 12a, 12b are further categorized as an upper optical black region 12a and a lower optical black region 12b. The horizontal optical black regions 12c, 12d are categorized as a left optical black region 12c and a right optical black region 12d.

Figure 3:
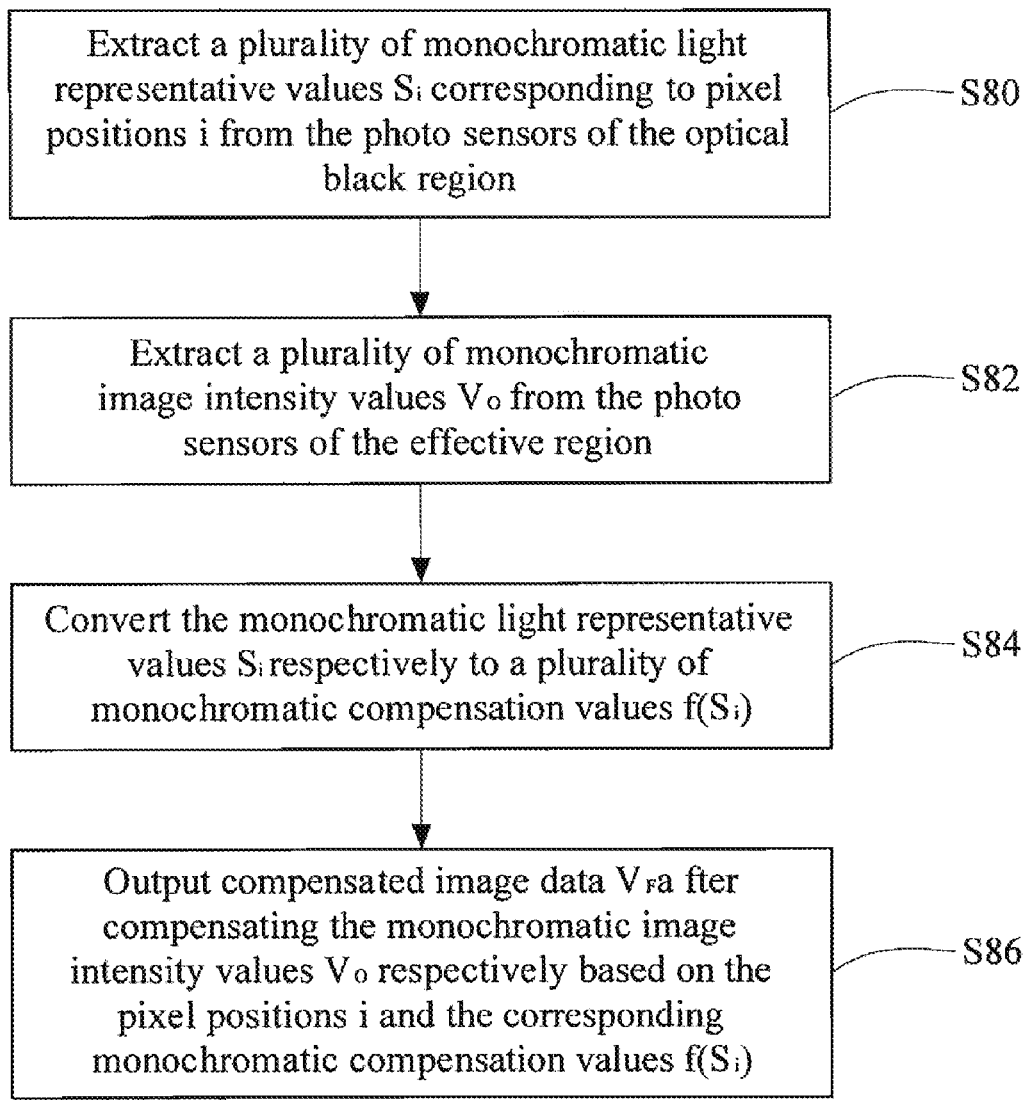
FIG. 3 is a flow chart according to an embodiment of the present invention.

Next, referring to FIG. 3, the image sensor 10 has a plurality of photo sensors 16a, 16b. The photo sensors 16a, 16b are used for receiving light transmitted from a scene, and converting the scene to corresponding image data through photoelectric conversion. As described above, the photo sensor 16a located in the optical black regions 12a, 12b, 12c, 12d cannot receive the light transmitted from the scene, while the photo sensor 16b located in the effective region can convert the scene to the image data.

Because most image sensors 10 are monochromatic photo sensors instead of color photo sensors, that is, a single photo sensor cannot sense different colors simultaneously. In order to achieve an effect of color sensing, a plurality of adjacent photo sensors is grouped into a filtering pattern. This filtering pattern can be, but is not limited to, a Bayer pattern. Each filtering pattern comprises a plurality of color filters. Taking the Bayer pattern as an example, the pattern comprises a red light filter (R), two green light filters (Gr, Gb) and a blue light filter (B). With the effect of the color filters, the photo sensor corresponding to a color filter only senses the intensity of a corresponding monochromatic light (taking red light as an example). However, for information about other monochromatic lights that the photo sensor misses (as described in the above example, the information about the monochromatic lights that the photo sensor misses are blue and green), the intensity for the entire three monochromatic lights of the photo sensor can be derived (for example, through interpolation) with the intensities of the monochromatic lights (blue and green) sensed by adjacent photo sensors. In an embodiment of the present invention, the Bayer pattern is used as the filtering pattern. But other types of patterns may also be used to implement the present invention.

According to the definition of the Bayer pattern, each Bayer pattern comprises four photo sensors. Taking FIG. 2B as an example, every four adjacent photo sensors constitute a Bayer pattern. The four photo sensors $22_R$, $22_{Gr}$, $22_{Gb}$, $22_B$ located in the optical black region 12a constitute a Bayer pattern 20. The optical black region 12a has a plurality of Bayer patterns 20. The four photo sensors $26_R$, $26_{Gr}$, $26_{Gb}$, $26_B$ located in the effective region 14 constitute another Bayer pattern 24, and the effective region 14 also has a plurality of Bayer patterns 24. Each of the four photo sensors $22_R$, $22_{Gr}$, $22_{Gb}$, $22_B$ represents a different monochromatic color channel respectively. Among them, the photo sensors $22_R$, $26_R$ represent red channels, the photo sensors $22_{Gr}$, $26_{Gr}$ represent green (Gr) channels corresponding to a red row, the photo sensors $22_{Gb}$, $26_{Gb}$ represent green (Gb) channels corresponding to a blue row, and the photo sensors $22_B$, $26_B$ represent blue channels.

In order to facilitate the illustration of the present invention, the definition "pixel position" here refers to a position on the horizontal axis in FIGS. 2A and 2B. While the "two photo sensors at the same pixel position in the same Bayer pattern in the optical black region 12a" refer to the photo sensors $22_R$, $22_{Gb}$, or the photo sensors $22_{Gr}$, $22_B$, that is, the photo sensors $22_R$, $22_{Gb}$ in the same Bayer pattern 20 on the same vertical line corresponding to a pixel position (or a pixel position on the same column). While the "two photo sensors at the same pixel position in the same Bayer pattern in the effective region 14" refer to the photo sensors $26_R$, $26_{Gb}$, or the photo sensors $26_{Gr}$, $26_B$.

EMBODIMENTS OF THE PRESENT INVENTION

FIG. 3 is a flow chart of a method for compensating image data according to the present invention. Referring to FIG. 3, the method is applicable to the image sensor 10. The image sensor 10 is used for converting the light transmitted from a scene to image data. The image sensor 10 has a plurality of photo sensors 16a, 16b, $22_R$, $22_{Gr}$, $22_{Gb}$, $22_B$, $26_R$, $26_{Gr}$, $26_{Gb}$, and $26_B$, and the photo sensors are arranged in an effective region 14 and an optical black region 12a. The method for compensating an image data comprises:

Step S80: a plurality of monochromatic light representative values $S_i$ corresponding to the pixel positions i is extracted from the photo sensors $22_R$, $22_{Gr}$, $22_{Gb}$, $22_B$ of the optical black region 12a;

Step S82: a plurality of monochromatic image intensity values $V_O$ is extracted from the photo sensors of the effective region;

Step S84: the monochromatic light representative values $S_i$ are converted respectively to a plurality of monochromatic compensation values $f(S_i)$; and Step S86: a compensated image data $V_F$ is output after compensating the monochromatic image intensity values $V_O$ respectively based on the pixel positions i and the corresponding monochromatic compensation values $f(S_i)$.

Steps S80, S82, S84 and S86 may be simplified as follows:

$$V_F = V_O - f(S_i)$$

where $S_i$ represents the monochromatic light representative values, $V_O$ represents the monochromatic image intensity values, $f(S_i)$ represents the monochromatic compensation values, and $V_F$ represents the compensated image data, that is, the output signals of the present invention. Each one of the above steps may be implemented in different ways. Step S84 is used for operating the monochromatic compensation values $f(S_i)$. Four embodiments of S84 are provided in the present invention, which are described below respectively.

Figure 4E:
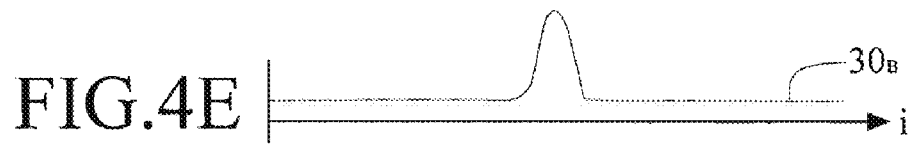
FIGS. 4B, 4C, 4D and 4E are schematic monochromatic light intensity profile views extracted in an upper optical black region when the image sensor of FIG. 4A produces the smear effect.
Figure 4D:
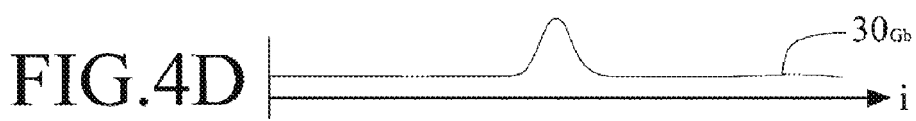
Figure 4C:
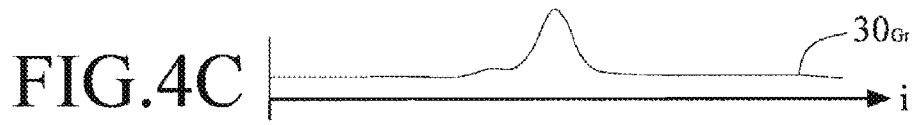
Figure 4B:
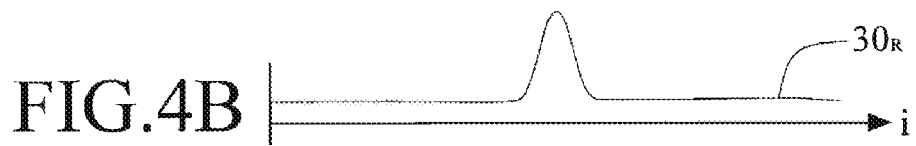
Figure 4A:
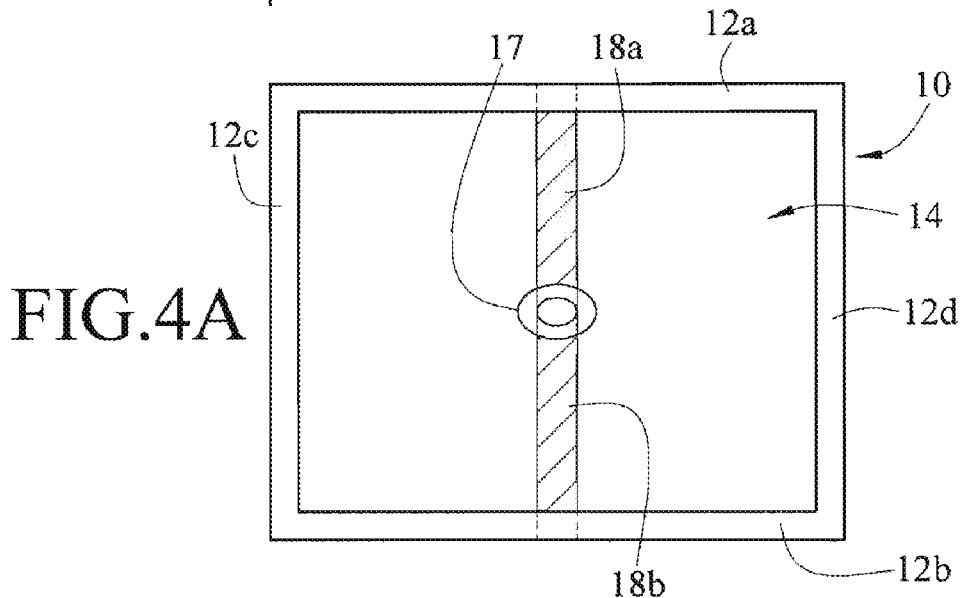
FIG. 4A is a schematic structural view of the image sensor 10 according to embodiments of the present invention.

As for S80, refer to FIG. 4A, which is a schematic structural view of the image sensor 10 according to an embodiment of the present invention.

The optical black region 12a described in S80 may be any one of the optical black regions 12a, 12b, 12c, 12d in FIG. 2A. The optical black regions 12a, 12b, 12c, 12d can be selected according to the time sequence of extracting the readings of the photo sensors $22_R$, $22_{Gr}$, $22_{Gb}$, $22_B$. For example, in FIG. 2A, if the extracting sequence is to extract row by row from top to bottom and from left to right, the upper optical black region 12a is preferably selected as the optical black region 12a. If the extracting sequence is row by row from bottom to top, the lower optical black region 12b is preferred, and so on. In order to facilitate the illustration, the upper optical black region 12a is taken as an example in the embodiments below of the present invention; however, the present invention is not so limited.

The extracting sequence of row by row from top to bottom refers to from the first pixel in the upper left to the first pixel in the upper right (that is, to scan and extract the topmost row along an axis i from left to right first). Then, the operation is lowered by one photo sensor, that is, the second row from the top is scanned to obtain the light intensity value of each photo sensor respectively.

It can be seen from FIG. 4A, a bright object appears in the scene shot by the image sensor 10. This bright object is referred to as an object smear pixel 17, as it may cause the storage potential after photoelectric conversion to be higher than a potential well of the interior photo sensors of the image sensor 10 (for example, CCD), resulting in the smear effect. The smear effect also causes the pixels above and below the object smear pixel 17 in a vertical direction, which are called stripe smear pixels 18a, 18b, to be affected by the charges overflowed for the smear effect, so an unnatural bright line can be seen in the vertical direction. The stripe smear pixels 18a, 18b also extend into the upper and lower optical black regions 12a, 12b. Therefore, the photo sensors $22_R$, $22_{Gr}$, $22_{Gb}$, $22_B$ in the upper and lower optical black regions 12a, 12b have light intensity responses even though not receiving light, that is to say, a voltage or current is still converted.

FIGS. 4B, 4C, 4D and 4E are monochromatic light intensity profiles $30_R$, $30_{Gr}$, $30_{Gb}$, $30_B$ respectively (also referred to as OB profiles for monochromatic lights) extracted on the upper optical black region 12a when a smear effect occurs to the image sensor 10. FIGS. 4B, 4C, 4D and 4E are the monochromatic light intensity profiles $30_R$, $30_{Gr}$, $30_{Gb}$, $30_B$ read by the photo sensors $22_R$, $22_{Gr}$, $22_{Gb}$, $22_B$ corresponding to each color filter of the Bayer pattern in the upper optical black region 12a respectively, in which $30_R$ is a red light intensity profile extracted by the photo sensor $22_R$ corresponding to a red filter, $30_{Gr}$ is a green light intensity profile extracted by the photo sensor $22_{Gr}$ corresponding to a green filter of a red row, $30_{Gb}$ is a green light intensity profile extracted by the photo sensor $22_{Gb}$ corresponding to a green filter of the red row, and $30_B$ is a blue light intensity profile extracted by the photo sensor $22_B$ corresponding to a blue filter.

The horizontal axis of each of the monochromatic light intensity profiles $30_R$, $30_{Gr}$, $30_{Gb}$, $30_B$ indicates the pixel positions, while the vertical axis indicates the extracted monochromatic light intensity values. Therefore, each of the monochromatic light intensity profiles $30_R$, $30_{Gr}$, $30_{Gb}$, $30_B$ is constituted by a plurality of light intensity values corresponding to different pixel positions. It can be seen from the drawings, the monochromatic light intensity value read at the pixel position corresponding to the object smear pixel 16 (also referred to as a pixel position obviously affected by the smear effect) is significantly higher than those of other pixel positions, and presents a shape of a peak. The intensity value at the same pixel position is not exactly the same on different monochromatic light intensity profiles $30_R$, $30_{Gr}$, $30_{Gb}$, $30_B$. If the bright object in the scene is pure red, only the light intensity profiles $30_R$, $30_{Gb}$ have the peak, while the other two light intensity profiles $30_{Gr}$, $30_B$ do not have the energy overflow because of the filters (in this embodiment, the energy overflow appears only in the vertical direction of the drawings, and is little in the horizontal direction). It is known from many experiments that, among the four monochromatic light intensity profiles, the intensity overflowed in red and blue is significantly higher than the intensity overflowed in green.

Therefore, if different monochromatic light intensity profiles are compensated with the same operation logic, the compensated colors may become distorted. Taking FIG. 2B as an example, there are two Bayer patterns 20 at the same pixel position in the upper optical black region 12a. Therefore, there are two red light intensity profiles $30_R$, four green light intensity profiles $30_{Gr}$, $30_{Gb}$, and two blue light intensity profiles $30_B$ in the upper optical black region 12a. The "monochromatic light representative value $S_i$" in Step S80 is an average value for all intensity values of the same monochromatic light corresponding to the same pixel position i in the optical black region. That is to say, the monochromatic light representative values $S_i$ are obtained by averaging the light intensity values extracted by the photo sensors $22_R$, $22_{Gr}$, $22_{Gb}$, $22_B$ corresponding to the pixel positions in the same column and the same color filter. Taking FIG. 2B as an example, the red light representative value $S_i$ at the pixel position i is an average of two red light intensity values, the green light representative value $S_i$ at the pixel position i is an average of two green light intensity values at the pixel position i, and the blue light representative value $S_i$ at the pixel position i is an average of two blue light intensity values. If the optical black region 12a has three Bayer patterns 20, an average value of the three intensity values for the same monochromatic light at the same pixel position is taken as the monochromatic light representative value $S_i$. If the optical black region 12a has there is only one Bayer pattern 20, the average value of the monochromatic light intensity values is taken as the monochromatic light representative value $S_i$. Other situations may be derived from the above description.

In the physical sense, by taking the average value of the three intensity values for the same monochromatic light at the same pixel position as the monochromatic light representative value $S_i$, the effect of low pass filter is achieved, which can remove unnecessary noise primarily, and make the compensation result better visually.

In addition, although the monochromatic light representative value $S_i$ takes the average value in the embodiment, $S_i$ may also be operated in other ways, for example, but not limited to, taking a mode as the monochromatic light representative value $S_i$.

Here, a set of a plurality of monochromatic light representative values $S_i$ corresponding to the same monochromatic light is referred to a monochromatic light representative value profile. That is to say, the upper optical black region 12a using the Bayer Pattern 20 has four monochromatic light representative value profiles, including a red light representative value profiles, two green light representative value profiles, and a blue light representative value profile.

Step S82 of "extracting a plurality of monochromatic image intensity values $V_O$ from the photo sensors $26_R$, $26_{Gr}$, $26_{Gb}$, $26_B$ of the effective region 14" is as follows: the monochromatic image intensity values $V_O$ of the photo sensors $26_R$, $26_{Gr}$, $26_{Gb}$, $26_B$ in each Bayer pattern 24 are extracted in the extracting sequence described above in the effective region 14. For example, the monochromatic image intensity values of photo sensors $26_R$, $26_{Gr}$, $26_{Gb}$, $26_B$ in the same Bayer pattern can be represented as $V_R$, $V_{Gr}$, $V_{Gb}$, $V_B$ respectively, in which $V_R$, $V_{Gb}$ belong to the same pixel position (which may be referred to the pixel corresponding to the same column), and $V_{Gr}$, $V_B$ also belong to the pixel corresponding to the same column. Therefore, each of the photo sensors $26_R$, $26_{Gr}$, $26_{Gb}$, $26_B$ has a image intensity value $V_R$, $V_{Gr}$, $V_{Gb}$, $V_B$ respectively.

Next, Step S84 of "converting the monochromatic light representative values $S_i$ respectively to a plurality of monochromatic compensation values $f(S_i)$" is performed. It is known from Steps S80 and S82 that, the monochromatic light representative values $S_i$ are corresponding to various pixel positions i. Therefore, a plurality of monochromatic compensation values $f(S_i)$ is also corresponding to a plurality of the pixel positions i. The monochromatic compensation values $f(S_i)$ are used for compensating the image intensity values $V_R$, $V_{Gr}$, $V_{Gb}$, $V_B$. Each image intensity value $V_R$, $V_{Gr}$, $V_{Gb}$, $V_B$ can obtain a compensation value $f(S_i)$ according to the pixel position i where it is located and/or its intensity value. Alternatively, two image intensity values on the pixel positions corresponding to the same column in the same Bayer pattern are corresponding to a compensation value. The conversion manner of the compensation values can be adjusted as needed. The present invention provides several embodiments for Step S84 in sequence, but is not so limited.

First Embodiment of Step S84

Figure 5:
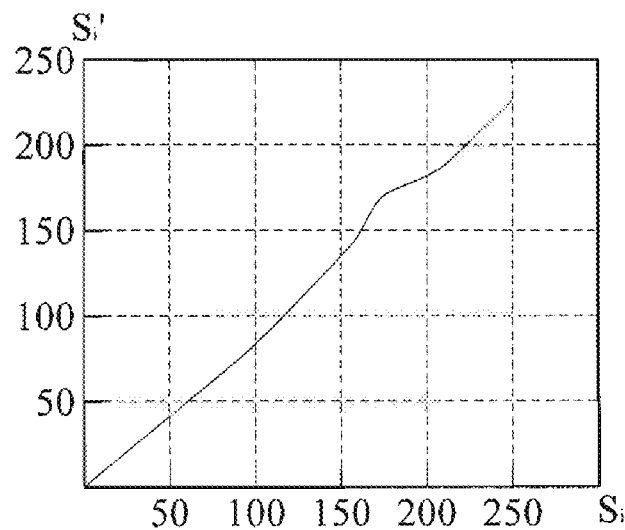
FIG. 5 is a schematic curve diagram of the conversion of monochromatic light representative values $S_i$ to monochromatic compensation values $S_i'$ according to a first embodiment of Step S84 of the present invention.

FIG. 5 is a schematic view of Step S84 according to a first embodiment of the present invention. Specifically, FIG. 5 is a curve diagram that converts the monochromatic light representative values $S_i$ to the monochromatic compensation values $S_i'$, in which $S_i'$ is $f(S_i)$. The horizontal axis in the drawing indicates the value of Si, and the vertical axis indicates the value of f(Si). The monochromatic light representative values in the drawing are illustrated by the example of 8-bit image (that is, the gray scale of each photo sensor is represented by 8 bits), so the maximum value is 255. For example, if the monochromatic light representative value $S_i$ is 100, the converted monochromatic compensation value $S_i'$ is about 95. Although FIG. 5 converts $S_i$ to $S_i'$ based on a smooth curve, a staged or stepped conversion profile may also be employed.

If the curve in FIG. 5 is converted to a look-up table, Step S84 is as follows: the monochromatic compensation values $S_i'$ are obtained by looking up the monochromatic light representative values $S_i$ in a look-up table according to a pixel intensity (or brightness of a pixel) corresponding to each pixel position i. The look-up table can be created in a manner of one-one mapping, or a 6-bit look-up table (that is, 64 corresponding values) can also be used, and the values that are not corresponded to are then calculated through interpolation. In this way, the use of a memory can be saved.

In addition, depending on the requirements of the user, the curve or look-up table for converting $S_i$ to $S_i'$ can use one curve or look-up table for all monochromatic light representative values, or a corresponding curve or look-up table may be created for each monochromatic light respectively.

The look-up table is created mainly by experimental values and empirical values. The factors to be considered to create the look-up table substantially comprise: different image sensors, different optical devices, different scenarios, different lighting conditions, features of different bright objects, and different dynamic modes. Among them, the different scenarios can be, but are not limited to, indoor shooting and outdoor shooting, the different lighting conditions can be, but are not limited to, noon, morning, dusk, indoor daylight, the different bright objects can be, but are not limited to, pure white light, pure red light, pure green light, and pure blue light, and the different dynamic modes can be, but are not limited to, static and travel conditions at different speeds. Besides, different shutter and exposure time can also be considered.

After shooting in the different scenarios, corresponding monochromatic compensation values $f(S_i)$ are adjusted manually, and after carrying out the compensation of Step S86 (which is described later in detail), observe whether obvious artifact exists with eyes. After suitable compensation values are obtained, the values are recorded as the compensation values in the corresponding environment.

It can be known from the above description that, the image intensity values are not considered in the conversion of $S_i$ to $f(S_i)$ according to the first embodiment; instead, the conversion is only related to the pixel positions where the photo sensors in the effective region 14 are located. Therefore, Step S84 can be exchanged with Step S82 without affecting the result of the present invention.

First Embodiment of Step S86

After the monochromatic compensation values $f(S_i)$ and the monochromatic image intensity values $V_O$ are obtained, Step S86 of "outputting a compensated image data $V_F$ after compensating the monochromatic image intensity values $V_O$ respectively based on the pixel positions i and the corresponding monochromatic compensation values $f(S_i)$" can be performed. The first embodiment of Step S86 is to obtain the compensated image data $V_F$ by performing addition or subtraction on the monochromatic compensation values $f(S_i)$ and the monochromatic image intensity values $V_O$. In other words, the image data $V_F$ is obtained after subtracting the monochromatic compensation values $f(S_i)$ from the monochromatic image intensity values $V_O$ extracted at the same pixel positions i (pixel positions corresponding to the same column). The process may be represented by $V_F=V_O-f(S_i)$ or $V_F=V_O-S_i'$. Although the first embodiment of S86 of the present invention is illustrated by the example of subtraction, but actual embodiments are not so limited.

With the implementation of the above embodiments of the present invention, the present invention provides different monochromatic compensation values $f(S_i)$ for different monochromatic image intensity values $V_O$, so that the smear compensation is more precise and is less likely to be affected by the light spectrum of the bright object. For example, it is known that the same pixel position has only one compensation value. Taking the Bayer pattern as an example, for the red light (R), green lights (Gr, Gb) or blue light (B), the compensation values are obtained with the same compensation principle (the same operation logic) at the same pixel position. However, although the positions of the photo sensors for R and Gb are at the same pixel position (on the same vertical line and the same column), the readings of the photo sensors for R and Gb represent the light intensities of R and Gb after the bright object passes through R and Gb filters respectively. If the bright object is not pure white, the readings for R and Gb must be different; if the same compensation logic is employed, the problem of improper compensation or obvious artifact is likely to occur. On the contrary, the present invention provides different monochromatic compensation values $f(S_i)$ for different monochromatic image intensity values $V_O$, so that the smear compensation are less likely to be affected by the light spectrum of the bright object.

Figure 6:
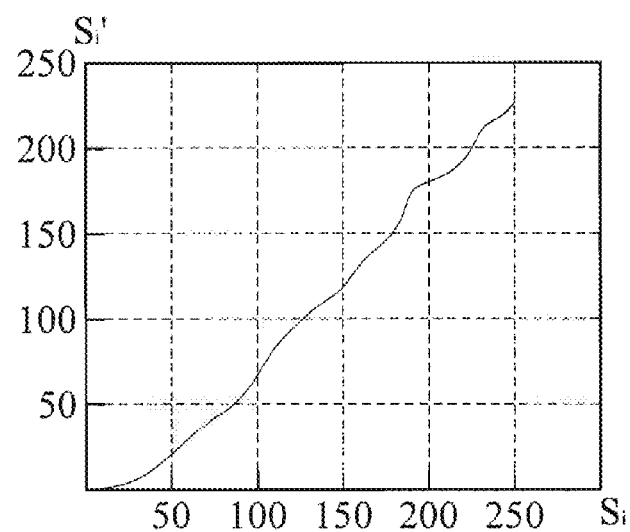
FIG. 6 is another schematic curve diagram of the conversion of monochromatic light representative values $S_i$ to monochromatic compensation values $S_i'$ according to the first embodiment of Step S84 of the present invention.

Further, FIG. 6 is another schematic curve diagram of the conversion of the monochromatic light representative values $S_i$ to the monochromatic compensation values $S_i'$ according to the first embodiment of Step S84 according to the present invention. Referring to FIG. 6, it can be seen from the drawing that the converted values of $S_i'$ are all rather small when Si is below 60. Most monochromatic light representative values $S_i$ below 60 read by the optical black region 12 are noise instead of the smear effect, so their monochromatic compensation values $S_i'$ may be set to values much smaller than the monochromatic light representative values $S_i$, or even zero. Such practice is adjusted mainly based on actual conditions.

Figure 7A:
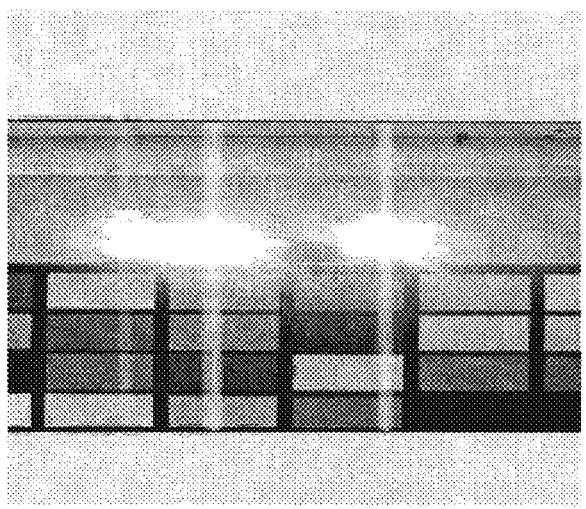
FIGS. 7A, 7B, and 7C are schematic comparison views before and after compensation according to the first embodiment and a second embodiment of Step S84 of the present invention.
Figure 7B:
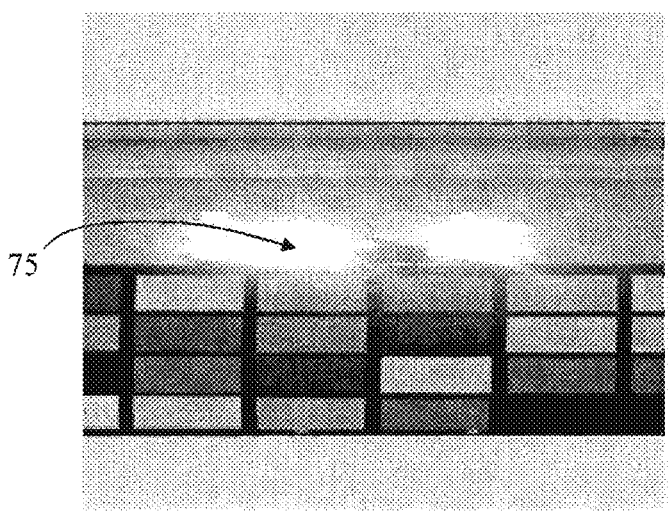
Figure 8A:
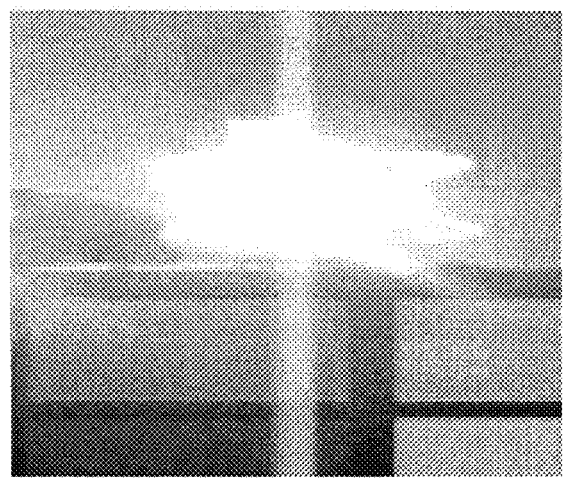
FIGS. 8A, 8B, and 8C are partial enlarged views of FIGS. 7A, 7B and 7C respectively.
Figure 8B:
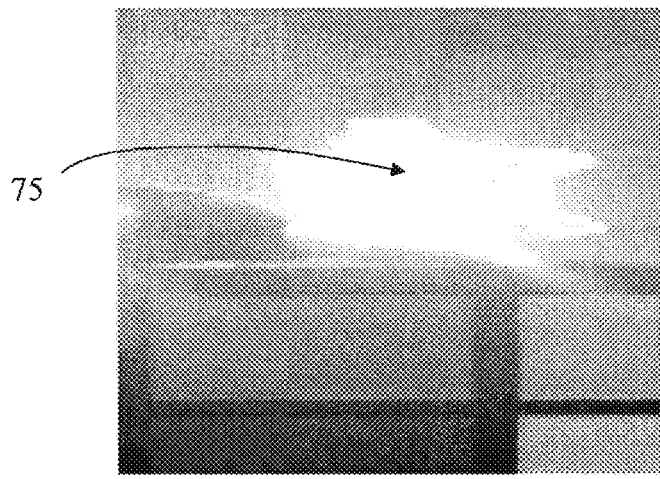

FIGS. 7A, 7B, 8A and 8B are schematic views of the results before and after compensating the image data by applying the first embodiment of Step S84 of the present invention of converting the monochromatic light representative values $S_i$ to the monochromatic compensation values $S_i'$. FIGS. 8A and 8B are partial enlarged views of FIGS. 7A and 7B. The partially enlarged positions are only at the right bright objects.

FIG. 7A is an image data that is not compensated shot in a scene by the image sensor 10. The scene has two light fixtures (that is, the bright objects in the present invention) and a color plate for disposing the light fixtures. Color blocks of different pure colors, such as red, yellow, green, blue, orange, cyan, indigotic, purple, gray, and brown, are disposed on the color plate. Thus, by shooting different color blocks, it can be determined whether the results of smear compensation through the method of the present invention have the problem of artifact, insufficient compensation, or over compensation. Although the six diagrams are represented in gray scale, they are shot and processed as color image data when being shot. All subsequent image pictures are processed with colors in shooting and image processing, but are represented in gray scale.

FIG. 7B is a schematic view after the compensation of the first embodiment of Step S84 of the present invention. It can be seen from FIG. 7B that, at the portions outside the bright objects, the smear effect has been eliminated obviously after compensation. But the position marked 75 is just located within the pixels of the bright object. The bright object should be all bright pixels visually, but is compensated improperly because of the compensation action of the first embodiment of S84 of the present invention, making the image data at this position appear to be artificial. The technical solution to the problem of the improper compensation can be found in other embodiments of Step S84. After the implementation of the other embodiments of Step S84 described later, the result diagrams in which the improper compensation problem is solved can be seen in FIGS. 7C and 8C. The other embodiments of Step S84 are described later in detail.

Compensation tests are carried out for the image data by applying the first embodiment of Step S84 of the present invention of converting the monochromatic light representative values $S_i$ to the monochromatic compensation values $S_i'$ (or referred to as adjusted representative values), and the different effects for different compensation magnitude are as shown in FIGS. 9A, 9B, 9C and 9D. FIGS. 10A, 10B, 10C, and 10D are schematic partial enlarged views of FIGS. 9A, 9B, 9C, and 9D respectively. The partially enlarged positions are at positions of the two bright objects in the drawings.

Figure 9A:
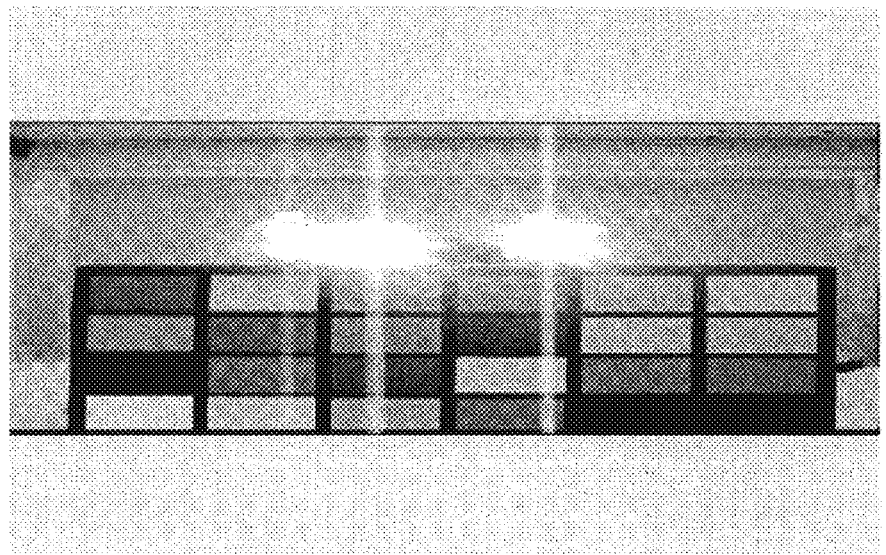
FIGS. 9A, 9B, 9C, and 9D are schematic comparison views of different conversion magnitudes of the conversion of monochromatic light representative values $S_i$ to monochromatic compensation values $S_i'$ according to the first embodiment of Step S84 of the present invention.

FIG. 9A shows the image data that is not compensated shot in a scene by the image sensor 10. The scene that is shot is the same as above, and is not described again here. It is obvious from FIG. 9A that there are three strips of smear positions in the image data. The smear effect in the middle is more severe, while the smear effect on the left is less severe.

Figure 9B:
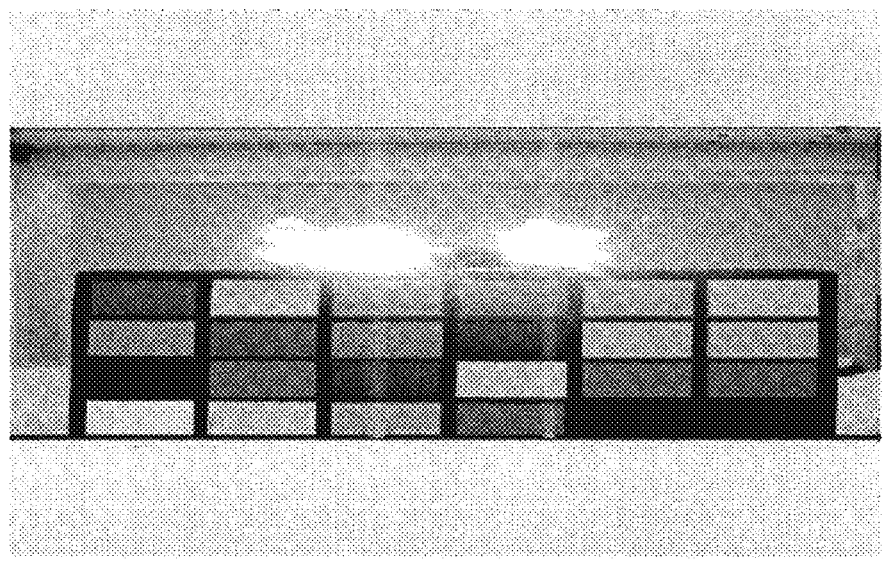
Figure 9C:
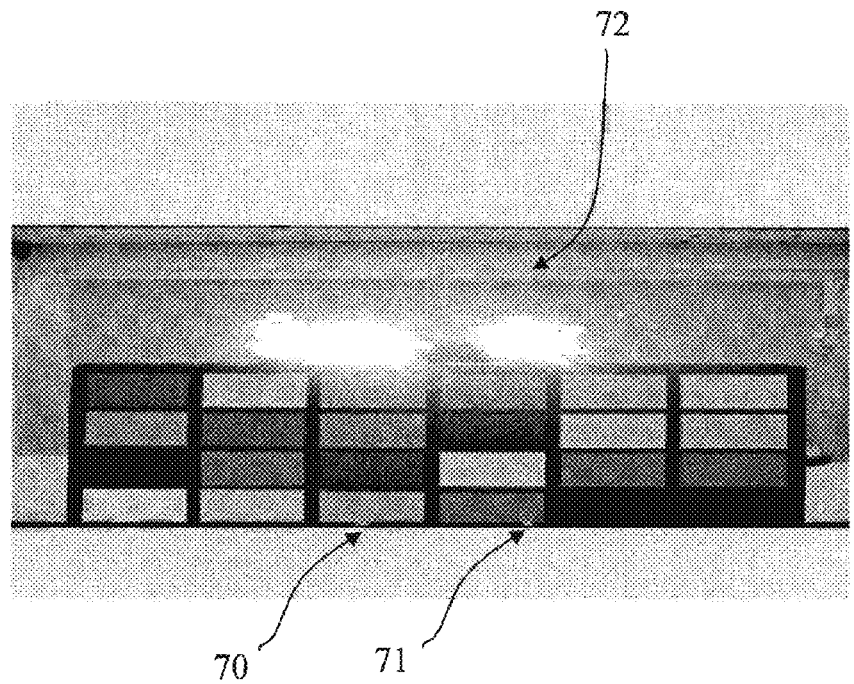
Figure 9D:
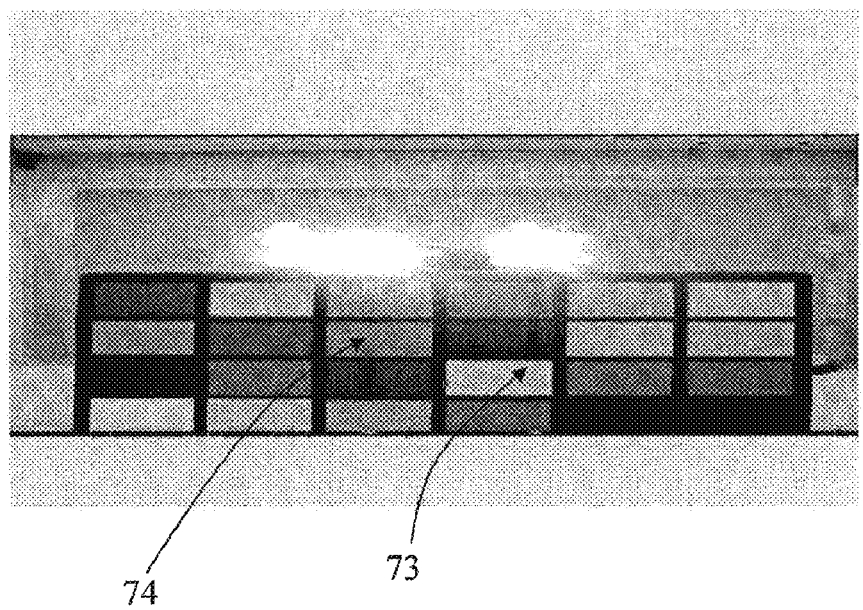
Figure 10A:
FIGS. 10A, 10B, 10C, and 10D are schematic partial enlarged views of FIGS. 9A, 9B, 9C, and 9D respectively.
Figure 10B:
Figure 10C:
Figure 10D:

FIGS. 9B, 9C and 9D are schematic result views of carrying out small, middle and great compensation magnitude on the image data of FIG. 9A with the first embodiment of Step S84 of the present invention. It can seen from FIGS. 9A and 10B that, the compensation effect for the two smear lines on the right is not obvious, and even the smear line on the left can also be recognized by eyes. It can be seen from the results of the compensation magnitude of FIGS. 9C and 10C that, the smear line on the left is successfully compensated, and the two smear lines on the right remain visible to eyes at some positions (the positions marked 70, 71 and 72). It can be seen from the result diagrams of the compensation magnitude of FIGS. 9D and 10D that the positions marked 73 and 74 are over compensated obviously. It can seen from the above three comparative diagrams that the effects of FIGS. 9C and 10C are the better, so the magnitude of the conversion of $S_i$ to $S_i'$ in Step S84 may use the example shown in FIGS. 9C and 10C.

The compensation magnitudes represent increased, unchanged or decreased magnitudes when converting $S_i$ to $S_i'$. FIG. 9B is illustrated through the example of decreased magnitude, FIG. 9C is illustrated through the example of substantially unchanged magnitude, and FIG. 9D is illustrated through the example of increased magnitude. The increased and decreased magnitudes decided through experiments as described above.

Second Embodiment of Step S84

Figure 11:
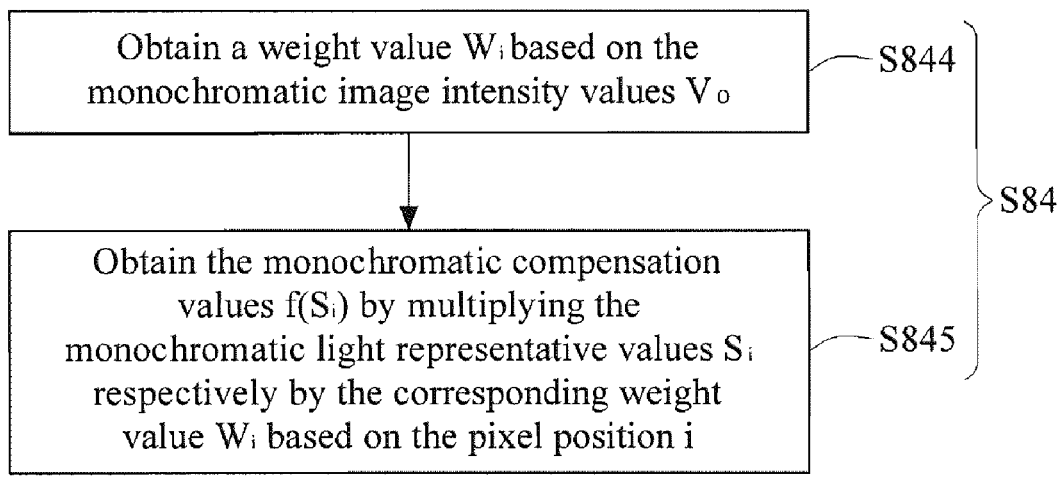
FIG. 11 is a schematic flow chart according to the second embodiment of Step S84 of the present invention.

Refer to FIG. 11 for the problem of over compensation of the image data corresponding to the bright object in FIGS. 7B and 8B, which is a schematic view of the second embodiment of Step S84. It can be seen from the drawing that Step S84 comprises:

Step S844: a weight value $W_i$ is obtained based on the monochromatic image intensity values $V_O$; and Step S845: the monochromatic compensation values $f(S_i)$ are obtained by multiplying the monochromatic light representative values $S_i$ respectively by the corresponding weight value $W_i$ according to the pixel positions i.

The result of the steps of the second embodiment of S84 ($f(S_i)=S_i*W_i$) is combined with the compensation algorithm in the first embodiment of Step S86, and the following equation is obtained: $F_F=F_O-S_i*W_i$. That is, Si (the monochromatic light representative values) are not converted to $S_i'$ (the adjusted representative values) as in the first embodiment of Step S84, but are multiplied directly by the weight value $W_i$ to obtain the monochromatic compensation values $f(S_i)$.

A rule for determining the weight value $W_i$ in Step S844 of "obtaining a weight value $W_i$ based on the monochromatic image intensity values $V_O$" is: when the monochromatic image intensity values $V_O$ are smaller than a first predetermined value ($V_T$), the weight value $W_i$ equals 1; otherwise, the weight value $W_i$ equals $(V_s-V_O)/(V_s-V_T)$, in which $V_S$ is the maximum extracted value when the photo sensor is saturated. The determine rule is converted to a program language as follows:

if($V_O<V_T$)

$W_i=1$;

else $W_i=(V_S-V_O)/(V_S-V_T)$;

End

Here, $V_T$ can be decided based on the tests of users. $V_T$ represents a threshold value for the image intensity readings for the bright object. When the value of $V_O$ is greater than the value of $V_T$, the photo sensor 16b of the effective region 14 corresponding to the value of $V_O$ should belong to the positions where the bright object is. That is to say, $V_T$ is used for determining whether the photo sensor 16b belongs to the bright object. If the photo sensor 16b belongs to the positions where the bright object is, over compensation should not be carried out (that is, $W_i$ can be set to 0, but the present invention adopts the fine adjustment, which is described later). On the contrary, if the photo sensor 16b of the effective region 14 does not belong to the positions where the bright object is (that is, $V_O<V_T$), the compensation should be carried out, so its weight value is set to 1. At this point, in Step S845, the monochromatic light representative values $S_i*W_i$ are directly subtracted from the monochromatic image intensity values $V_O$ to obtain the compensated image data $V_F$.

When the photo sensor 16b belongs to the positions where the bright object is, the present invention still carries out the fine adjustment compensation as indicated by the weight value $W_i$ setting of $(V_S-V_O)/(V_S-V_T)$. When the photo sensor 16b is located at the positions where the bright object is, the $V_O$ value thereof is close to the $V_S$ value, so the numerator of the weight value $W_i$ is relatively small, the denominator is relatively large, and the weight value $W_i$ must be between 0 and 1. Meanwhile, according to the operation formula, the weight value $W_i$ is set to a smaller value with the increase of the value of $V_O$. Thus, the compensated values are much reduced relatively. Through this fine adjustment technology of the compensation for bright regions, the pictures near a light source can be made smoother, so as not to generate the result of compensation or not compensation when the positions of $V_O$ are different only by one.

The $V_S$ is the maximum extracted value when the photo sensor is saturated. Taking an 8-bit image as an example, the value of $V_S$ is 255. The values of $V_T$ may be experimental or empirical values, for example, 211, 189, 230, and the like. However, considering the fine adjustment described above, the value of $V_T$ may be set to 239 or 223. Thus, the denominator of $W_i$ for the bright object is 16 and 32, which is a power of 2. Therefore, the division operation using the denominator can be achieved in computer operation through bit shift (shift 4 or 5 bits rightward), simplifying the complexity of operation and increasing the processing speed.

Figure 7C:
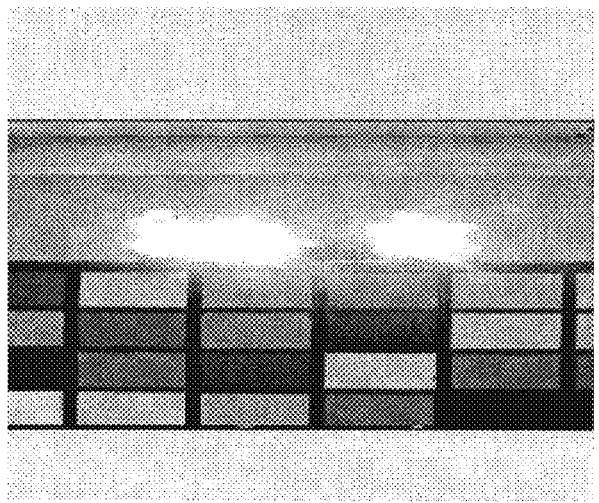
Figure 8C:
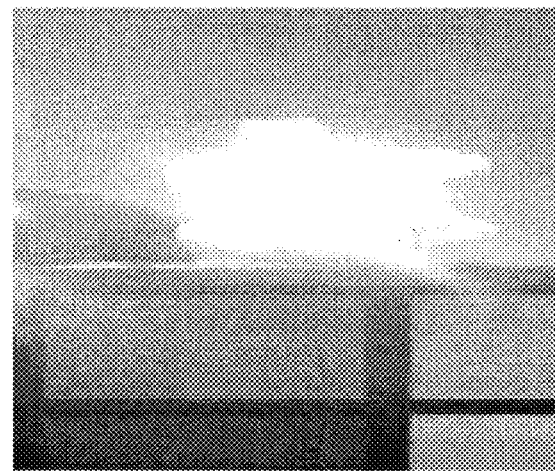

By implementing the second embodiment of Step S84 in the image data of FIGS. 7A and 7B, the compensated results are as shown in FIGS. 7C and 8C. It can be seen obviously that, the image data at the positions of bright points is protected by the weight value $W_i$, so as not to produce the visual sense of artifact.

Third Embodiment of Step S84

Figure 12:
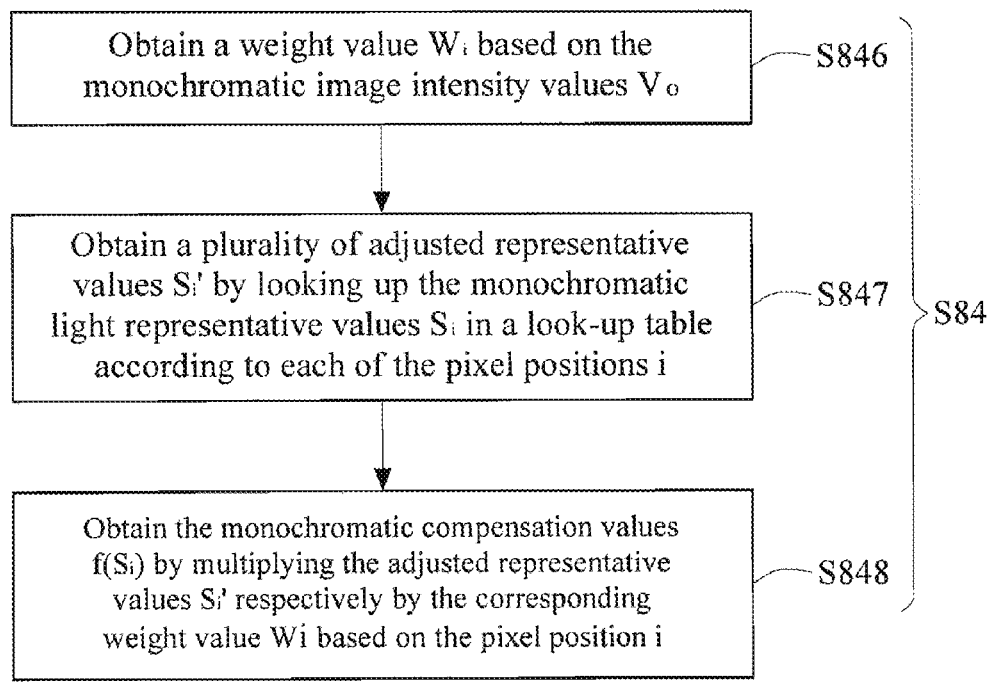
FIG. 12 is a schematic flow chart according to a third embodiment of Step S84 of the present invention.

FIG. 12 is a flow chart of a third embodiment of Step S84 "converting the monochromatic light representative values $S_i$ respectively to a plurality of monochromatic compensation values $f(S_i)$". Referring to FIG. 12, it can be seen that Step S84 comprises:

Step S846: a weight value $W_i$ is obtained based on the monochromatic image intensity values $V_O$;

Step S847: a plurality of adjusted representative values $S_i'$ are obtained by looking up the monochromatic light representative values $S_i$ in a look-up table according to a pixel intensity of each of the pixel positions i; and Step S848: the monochromatic compensation values $f(S_i)$ are obtained by multiplying the adjusted representative values $S_i'$ respectively by the corresponding weight value $W_i$ based on the pixel positions i (that is, $f(S_i)=S_i'*W_i$).

Step S846 is the same as Step S844, and is not described again here.

Step S847 is the same as the first embodiment of Step S84, which is a method of converting $S_i$ to $S_i'$ based on a look-up table, and is not described again here.

As for Step S848 of "obtaining the monochromatic compensation values $f(S_i)$ by multiplying the adjusted representative values $S_i'$ respectively by the corresponding weight value $W_i$ based on the pixel positions i", it is mainly to multiply the weight value W, by the preferable empirical monochromatic representative values $S_i'$. In this way, both the preferred state of compensation and the effect of protecting the photo sensor 16b corresponding to the bright object against over compensation can be achieved.

Next, for the technical problems described above, when a shot scene has a bright object, the monochromatic light intensity values read by the photo sensors 16b corresponding to the red and blue light are higher than the monochromatic light intensity value read by the photo sensor 16b corresponding to the green light after several experiments. Therefore, in the photo sensors at the same pixel position i corresponding to the bright object, the degree of overflow of the image intensity values $V_O$ caused by the smear effect is different. Referring to FIG. 2B again, taking the red photo sensor $26_R$ and the green photo sensor $26_{Gb}$ for example, at the same pixel position i, the red image intensity value $V_R$ is greater than the green (Gb) image intensity value $V_{Gb}$, making the degree of overflow of the red image intensity value $V_R$ more serious than that of the green (Gb) image intensity value $V_{Gb}$. Therefore, when determining the weight value $W_i$, the green photo sensor $26_{Gb}$ obtains $W_i$ based on the rule of Step S844 with the green image intensity value $V_{Gb}$ as an index. Thus, the red photo sensor $26_R$ may not carry out the compensation for the bright object ($V_R>V_T$, $W_i<1$), while the green photo sensor $26_{Gb}$ carries out the compensation (because $V_{Gb}<V_T$, $W_i=1$). Thus, in the image data corresponding to the bright object, some portions are compensated and other portions are not compensated at the same pixel position i, causing an obvious visual sense of artifact in the compensated image data.

Besides the technical problems described above, if the bright object belongs to a strong monochromatic light, the improper compensation may be more obvious. For example, when the bright object is a strong red light, the image intensity value $V_R$ of the red photo sensor (R) among the photo sensors $26_R$, $26_{Gr}$, $26_{Gb}$, $26_B$ in the same Bayer pattern 24 of the effective region 14 is greater than the first predetermined value $V_T$ ($V_R>V_T$, Wi<1), but the image intensity values $V_B$ and $V_{Gr}$ of the green photo sensor (Gr) and the blue photo sensor (B) is lower than the first predetermined value $V_T$ ($V_B<V_T$, Wi<=1), resulting in a problem that one column is compensated, but another column is not compensated, which is referred to the problem of neighboring column not compensated.

Fourth Embodiment of Step S84

Figure 13:
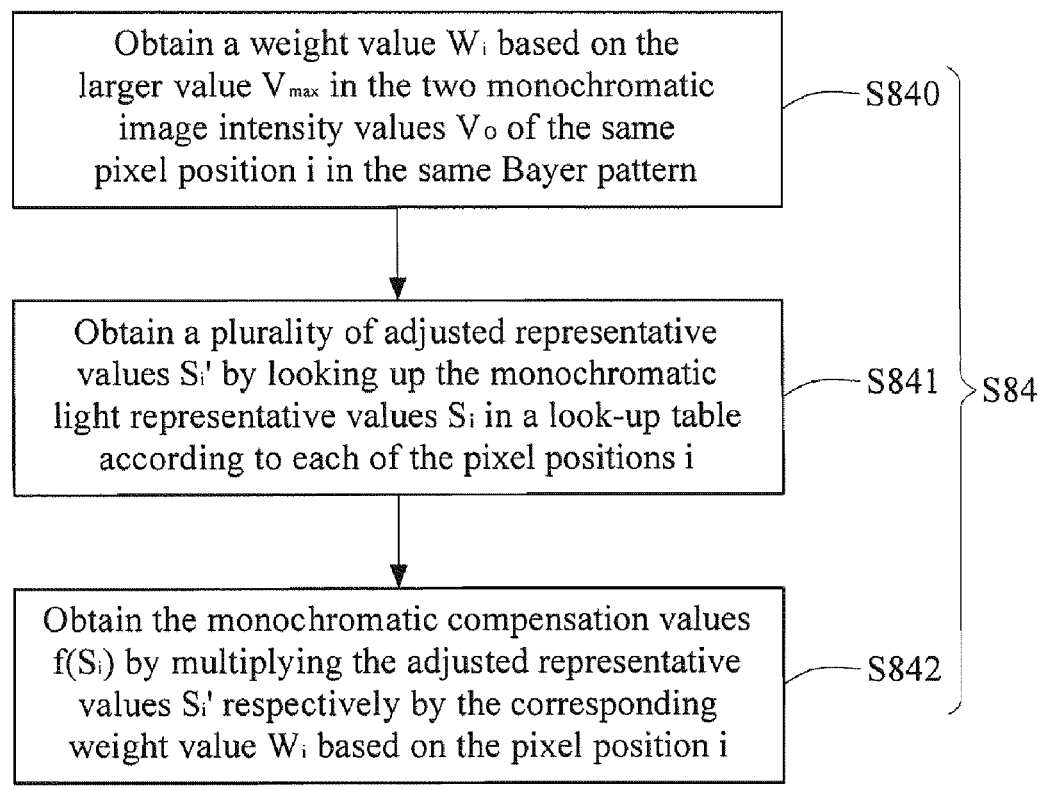
FIG. 13 is a schematic flow chart according to a fourth embodiment of Step S84 of the present invention.

To solving the above technical problems, the present invention provides a fourth embodiment of Step S84. Referring to FIG. 13, Step S84 of "converting the monochromatic light representative values $S_i$ respectively to a plurality of monochromatic compensation values $f(S_i)$" comprises:

Step S840: a weight value $W_i$ is obtained based on the larger value Vmax in the two monochromatic image intensity values $V_O$ at the same pixel position i in the same Bayer pattern;

Step S841: a plurality of adjusted representative values $S_i'$ are obtained by looking up the monochromatic light representative values $S_i$ in a look-up table according to a pixel intensity of each of the pixel positions i; and Step S842: the monochromatic compensation values $f(S_i)$ are obtained by multiplying the adjusted representative values $S_i'$ respectively by the corresponding weight value $W_i$ based on the pixel position i (that is, $f(S_i)=S_i'*W_i$).

Taking the two photo sensors at the same position i in the technical problems described above for example (the red photo sensor $26_R$ and the green photo sensor $26_{Gb}$), in Step S840, the larger value of the two (that is, $V_R$ and $V_{Gb}$) is taken as Vmax, for the above example, Vmax=$V_R$. Then $W_i$ is obtained by using Vmax as a reference value. If the bright object is pure green light, then Vmax=$V_{Gb}$.

In the example above, the larger value Vmax here is so called because there are only two photo sensors ($26_R$, $26_{Gb}$ or $26_{Gr}$, $26_B$) corresponding to the same pixel position i of a single Bayer pattern 24. But if other patterns are employed, and there are more than two photo sensors corresponding to the same pixel position i for the patterns, a largest value needs to be taken.

Figure 14:
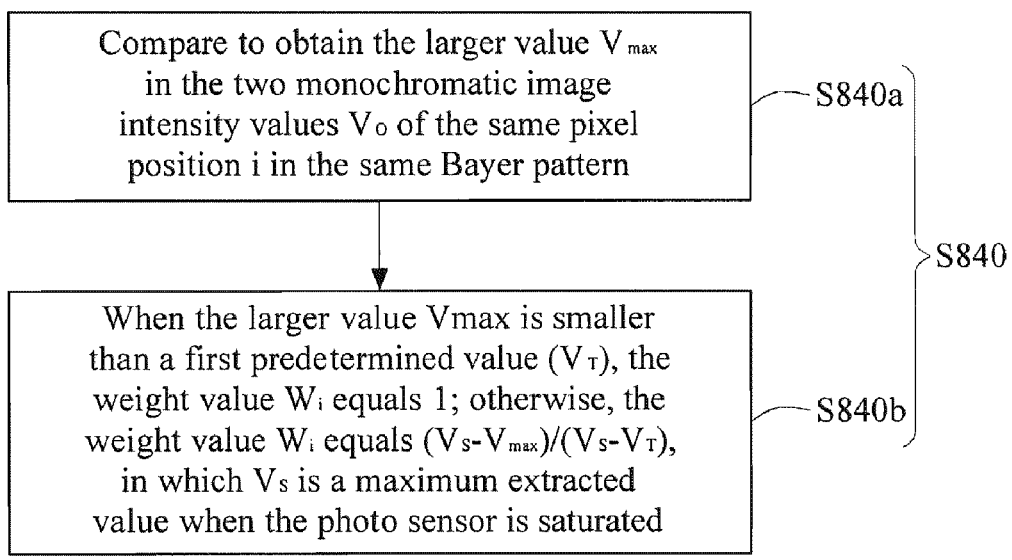
FIG. 14 is a schematic flow chart according to an embodiment of Step S840 of the present invention.

As for the implementation of S840, refer to FIG. 14, which is a schematic view of an embodiment of Step S840. It can be known from the drawing that Step S840 comprises:

Step S840a: the larger value Vmax is compared and obtained in the two monochromatic image intensity values $V_O$ at the same pixel position i in the same Bayer pattern; and Step S840b: when the larger value Vmax is smaller than a first predetermined value ($V_T$), the weight value $W_i$ equals 1; otherwise, the weight value $W_i$ equals ($V_S$−Vmax)/($V_S$−$V_T$), in which $V_S$ is a maximum extracted value when the photo sensor is saturated.

Taking the photo sensors $26_R$, $26_{Gb}$ at the same pixel position i for example, the photo sensors $26_R$, $26_{Gb}$ are located in the same Bayer Pattern 24, and are located at the same pixel position i. According to Step S840a, Vmax=$V_R$.

Next, Step S840b is implemented, which is similar to the embodiments of Step S844 and Step S846. The difference lies in that the monochromatic image intensity values $V_O$ are changed to the larger value Vmax. Therefore, Step 840b is not described again here.

Step S841 is similar to the first embodiment of Step S84 and Step S847, and Step S842 is similar to Step S848, so they are not described again here.

As for the effect of the fourth embodiment of S84, it should be noted that because the errors of the pixel level, related drawings are not appended because the improper compensation in the patent drawings is not easy to recognize after conversion.

The technical problems of the smear effect can be solved by the fourth embodiment of S84. However, improper compensation may still occur to some special smear occasions. As for this, refer to FIGS. 15A and 15B. In addition, FIGS. 16A and 16B are schematic partial enlarged views of the smear positions on the right of FIGS. 15A and 15B.

Figure 15A:
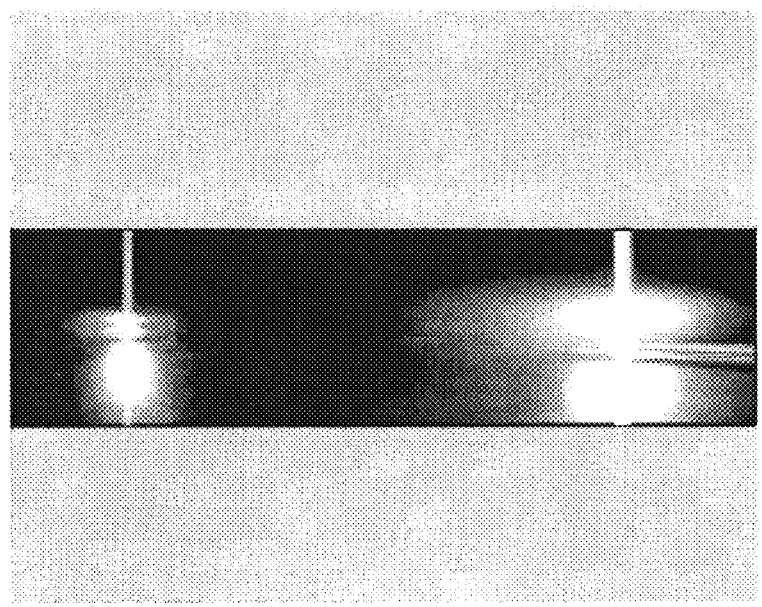
FIGS. 15A and 15B are schematic comparison views of the image data before and after the compensation according to the fourth embodiment of S84 of the present invention.
Figure 15B:
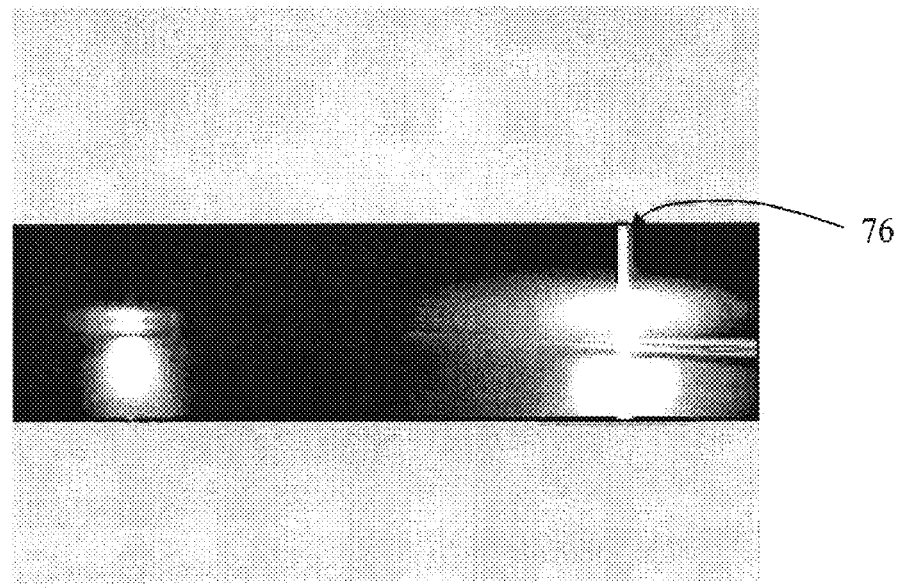
Figure 16A:
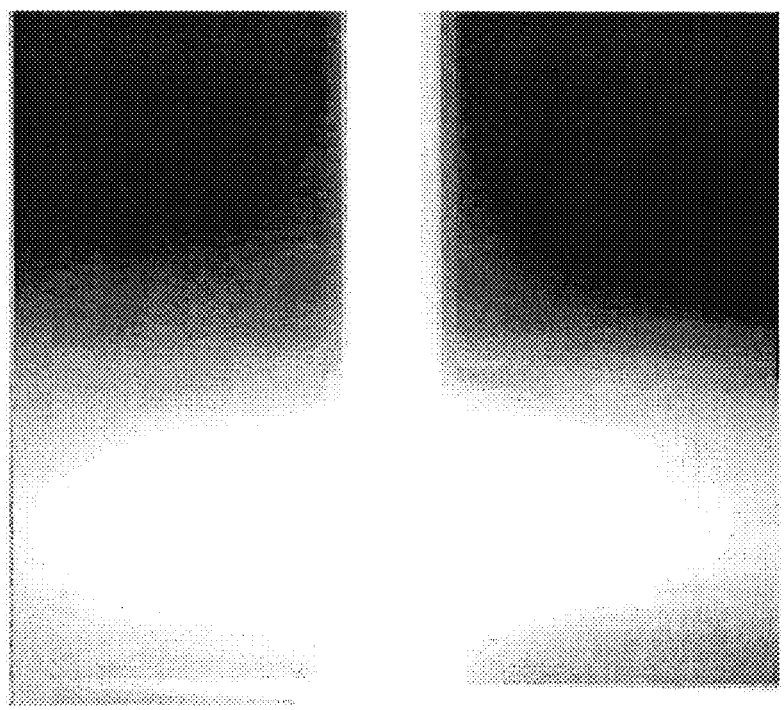
FIGS. 16A and 16B are schematic partial enlarged views of FIGS. 15A and 15B.
Figure 16B:
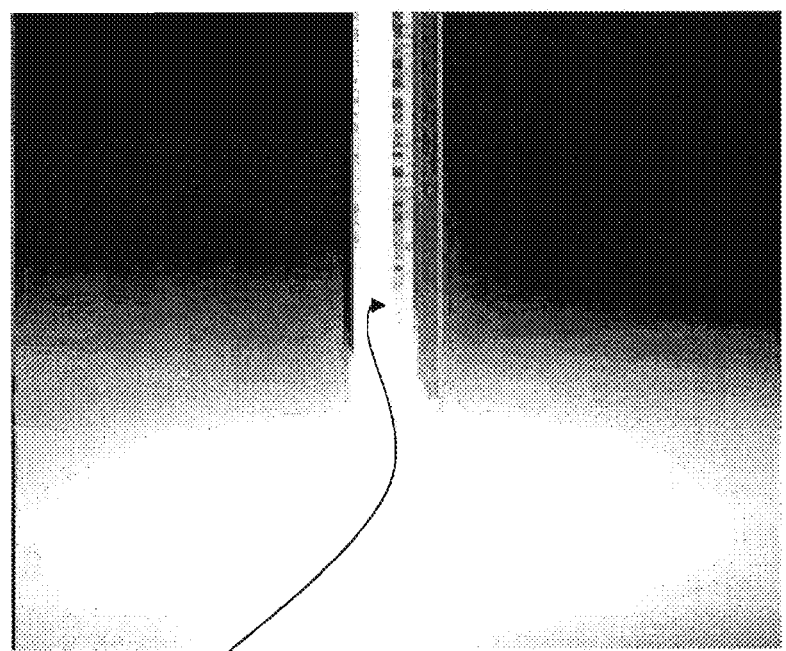

Two bright objects are shown in FIG. 15A, and two obvious smear lines are produced. The smear line on the left has been compensated suitably, while the smear line on the right still has improper compensation at some positions (marked 76) due to the gradual compensation (fine adjustment). Although the improper compensation can adjust a first preset value of the weight value $W_i$, the division of the weight value $W_i$ may consume excessive operation time. Therefore, the present invention presents a second embodiment of Step S86 in order to solve this technical problem.

Second Embodiment of Step S86

Figure 17:
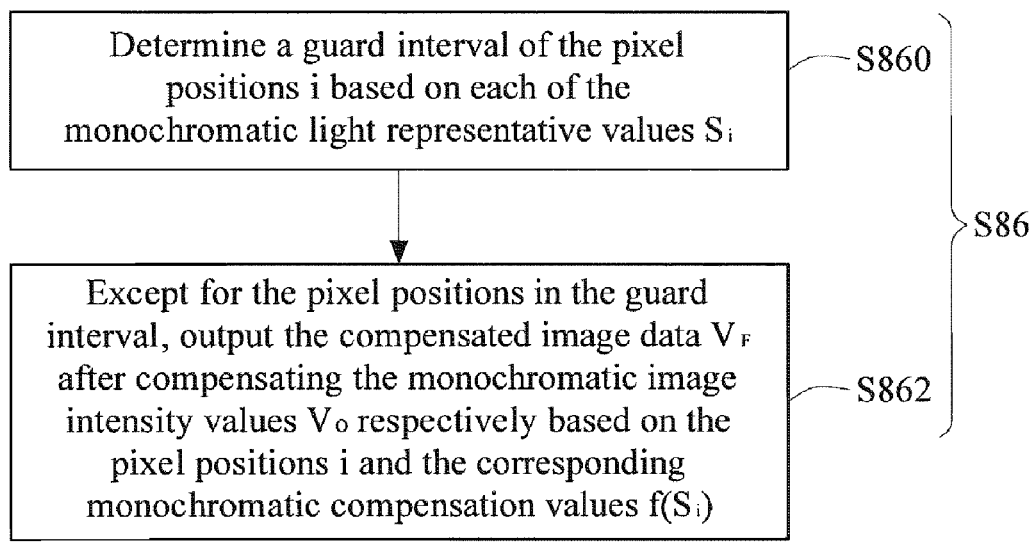
FIG. 17 is a schematic flow chart according to a second embodiment of Step S86 of the present invention.

FIG. 17 is a schematic flow chart of a second embodiment of Step S86 of the present invention. Referring to FIG. 17, Step S86 of "outputting a compensated image data $V_F$ after compensating the monochromatic image intensity values $V_O$ respectively based on the pixel positions i and the corresponding monochromatic compensation values $f(S_i)$" comprises:

Step S860: a guard interval of the pixel positions i are determined based on each of the monochromatic light representative values $S_i$; and Step S862: except for the pixel positions in the guard interval, the compensated image data $V_F$ is output after compensating the monochromatic image intensity values $V_O$ respectively based on the pixel positions i and the corresponding monochromatic compensation values $f(S_i)$.

Figure 18:
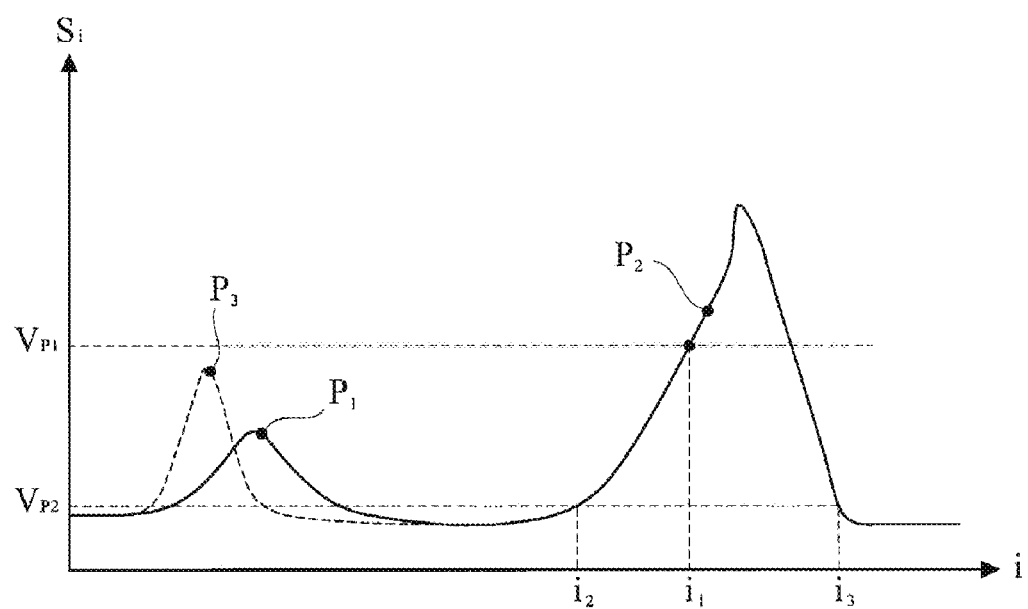

In order to facilitate the illustration of Step S860, refer to FIG. 18, which is a schematic view of a monochromatic light intensity profile of the image data in FIG. 15A in the upper optical black region 12a. It should be noted that, the dashed line P3 in FIG. 18 is not the monochromatic light intensity profile in FIG. 15A, but is only used for subsequent calculation examples. As shown in FIG. 18, the monochromatic light intensity representative values Si (or the monochromatic light intensity values) at some positions in the optical black region (higher than intensity of $V_{P1}$) are obviously too high. The light intensity at the positions of the smear line is as the light intensity at the bright positions, and such positions also should be protected, which is called a guard interval (the region from i2 to i3). The guard interval is not compensated, so as to avoid the visual sense of artifact.

Figure 19:
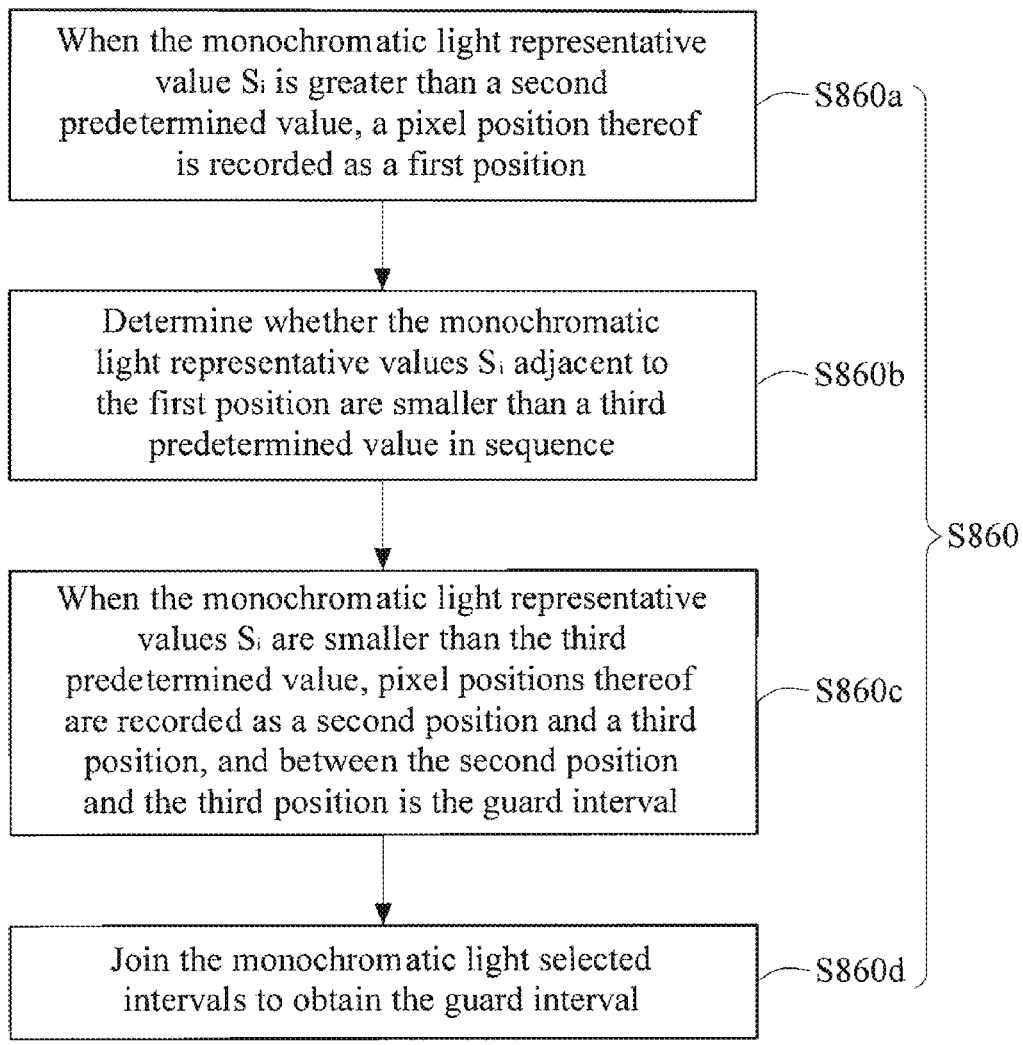
FIG. 19 is a schematic flow chart according to an embodiment of Step S860 of the present invention.

As for the setting of the guard interval, refer to FIG. 19, which illustrates the implementation steps of Step S860 "determining a guard interval of the pixel positions i based on each of the monochromatic light representative values $S_i$". It can be seen from the drawing that, Step S860 comprises:

Step S860a: a monochromatic light representative value profile is selected in sequence in the same Bayer pattern 20, and when the monochromatic light representative value $S_i$ of the selected monochromatic light representative value profile is greater than a second predetermined value $V_{P1}$, the pixel position thereof is recorded as a first position i1;

Step S860b: in the same selected monochromatic light representative value profile, it is determined whether the monochromatic light representative values $S_i$ adjacent to the first position are smaller than a third predetermined value $V_{P2}$;

Step S860c: in the same selected monochromatic light representative value profile, when the monochromatic light representative values $S_i$ are smaller than the third predetermined value $V_{P2}$, the pixel positions thereof are recorded as a second position i2 and a third position i3, and between the second position i2 and the third position i3 is a monochromatic light selected interval; and Step S860d: the monochromatic light selected intervals are joined to obtain the guard interval.

Among these, the "selecting a monochromatic light representative value profile in sequence in the same Bayer pattern 20" in Step S860a represents selecting one of four monochromatic light representative value profiles in sequence to carry out Steps S860a, S860b, S860c to obtain a monochromatic light selected interval respectively. Therefore, after Step S860c is completed, four monochromatic light selected intervals can be obtained, and then Step S860d is carried out. Here, Steps S860a, S860b, S860c are performed to obtain four first positions i1, four second positions i2, four third positions i3 respectively, and then four monochromatic light selected intervals are obtained at the same time. However, in actual implementation, one monochromatic light representative value profile can be selected first, and Steps S860a, S860b, S860c are performed on the selected profile to obtain a monochromatic light selected interval; then, another monochromatic light representative value profile is selected, and Steps S860a, S860b, S860c are performed to obtain another monochromatic light selected interval. Thus, Steps S860a, S860b, S860c are repeated for four times altogether to obtain four monochromatic light selected intervals.

The second predetermined value $V_{P1}$ in Step S860a is used for determining whether the smear line has the bright intensity as the bright object (that is, $V_{P1}$ is used for determining whether the photo sensors recognized to have the serious smear effect for which a reasonable compensation result cannot be achieved even if compensation is made are found). If yes, the vicinity of the pixel position (the first position i1) corresponding to the value is not compensated, so as to avoid artifact.

In FIG. 18, when the program carries out determination, the determination is made from left to right of the pixel position i in sequence, that is, a sequence increasing gradually from the pixel position of 1. If the light intensity representative value Si corresponding to the pixel position i is greater than the second predetermined value $V_{P1}$, the corresponding first position i1 is recorded. The determination sequence may also be reversed, that is, from right to left of the pixel position i, which will not described again here.

Then, the second position i2 and the third position i3 are located according to Step S860b of "in the same selected monochromatic light representative value profile, determining whether the monochromatic light representative values $S_i$ adjacent to the first position are smaller than a third predetermined value $V_{P2}$ in sequence", that is, determining whether the light intensity representative values Si at the pixel positions on the left and right of the first position i1 are greater than the third predetermined value $V_{P2}$, in other words, whether the monochromatic light representative values $S_i$ at the adjacent pixel positions greater than the first position (right) and smaller than the first position (left) respectively are smaller than a third predetermined value $V_{P2}$.

Here, the second position i2 is located as follows: determine the light intensity representative values Si corresponding to the positions from the first position i1 toward left one by one (pixel positions decreased); the third position i3 is located as follows: determine the light intensity representative values Si corresponding to the positions from the first position i1 toward right one by one (pixel positions increased). After the second position i2 and the third position i3 are obtained, the interval between the second position i2 and the third position i3 is defined as a monochromatic light selected interval (that is, Step S860c). After Steps S860a, S860b, S860c are repeated, four monochromatic light selected intervals can be obtained. After that, Step S860d of "joining the monochromatic light selected intervals to obtain the guard interval" is carried out, and then the subsequent Step S862 is carried out.

The joining in Step S860d can prevent the problem of neighboring column not compensated caused by strong monochromatic light.

Step S862 is as follows: except for the pixel positions in the guard interval, the compensated image data $V_F$ is output after compensating the monochromatic image intensity values $V_O$ respectively based on the pixel positions i and the corresponding monochromatic compensation values $f(S_i)$. Therefore, the compensation is not carried out in the guard interval (between i2 and i3), thus solving the previous problem.

Referring to FIG. 18 again, it can be seen from FIG. 18 that, the left side of the monochromatic light representative value profile still has a position where the smear effect occurs (indicated by a dashed line), for which no selected intervals are recorded because none of the light intensity representative values Si is greater than the second predetermined value $V_{P1}$. If no selected intervals are recorded for the other three monochromatic lights after operation, the position where the smear effect occurs on the left still belongs to a compensable region. Therefore, when the second predetermined value $V_{P1}$ and third predetermined value $V_{P2}$ are decided, besides the light intensity representative values of the bright object, this factor also need to be considered to achieve a preferred implementation effect. Meanwhile, the third predetermined value $V_{P2}$ is smaller than the second predetermined value $V_{P1}$.

Figure 20A:
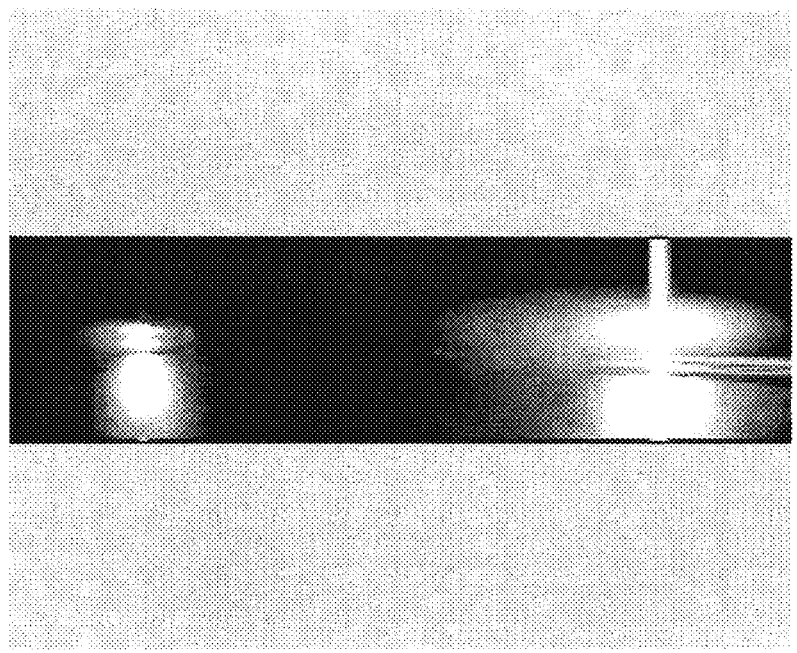
FIG. 20A is a schematic view of the image in FIG. 15 after the compensation according to the second embodiment of Step S86 of the present invention.
Figure 20B:
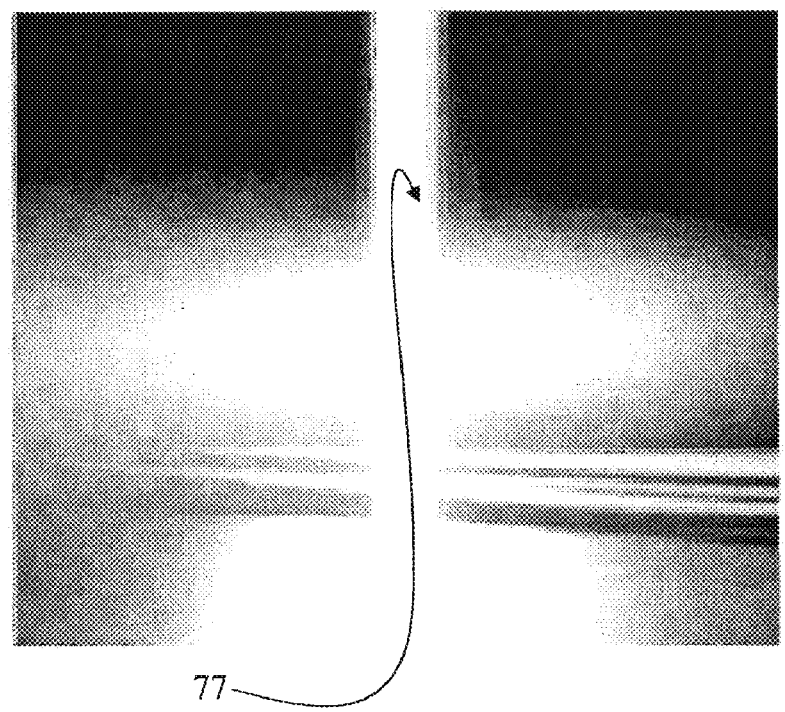
FIG. 20B is a schematic partial enlarged view of a smear line on the right of FIG. 20A.

FIGS. 20A and 20B are result diagrams of the image data after the compensation according to the second embodiment of Step S86 of the present invention. FIG. 20A is a schematic view of the image in FIG. 15A after the compensation according to the second embodiment of Step S86 of the present invention. FIG. 20B is a schematic partial enlarged view of the smear line on the right of FIG. 20A. Referring to FIGS. 20A and 20B, it can be seen from the drawings that, no improper compensation to the smear line occurs at the position marked 77, and the entire effect is fairly natural and has no sense of artifact.

In order to illustrate the present invention more clearly, the following examples are demonstrated, but the examples are not used to limit the scope of the present invention.

Calculation Example I

The 8-bit images are taken for example in this calculation example, which means the gray scale resolution for each photo sensor is 256 (from 0 to 255). Therefore, the maximum extracted value when the photo sensor is saturated is 255. FIG. 18 is assumed to be the red light intensity profile of the optical black region 12a of this calculation example. The first predetermined value $V_T$ is 191. The second predetermined value $V_{P1}$ is 220. The third predetermined value $V_{P2}$ is 100. The calculation example is demonstrated with embodiments of S80 and S82, the fourth embodiment of S84, and the second embodiment of S86 of the present invention.

Firstly, it is assumed that the photo sensors $22_R$, $22_{Gb}$ in the effective region 14 of FIG. 2B are corresponding to the position P1 in the left of FIG. 18. In FIG. 18, it is assumed that the red (R) light intensity representative value Si corresponding to P1 is 122 ($S_R$), and the green (Gb) light intensity representative value Si corresponding to P1 is 118 ($S_{Gb}$). It is assumed that the monochromatic image intensity value $V_O$ representing the red photo sensor $22_R$ is 183 ($V_R$), while the monochromatic image intensity value $V_O$ representing the green (Gb) photo sensor is 158 ($V_{Gb}$). It is assumed that FIG. 5 is a schematic curve diagram of the conversion from the red light representative values $S_i$ to the monochromatic compensation values $S_i'$, and FIG. 6 is a schematic curve diagram of the conversion of the green light representative values $S_i$ to the monochromatic compensation values $S_i'$. In this calculation example, different monochromatic lights are converted by employing different profiles of the conversion of Si to $S_i'$, but as described previously, the four colors may also be converted by using the same profile.

Firstly, obtaining the monochromatic light intensity representative values $S_i'$: $S_{R=122}$ is used to look up FIG. 5 to determine that the red light intensity representative value $Si'_R$ is 103. $S_{Gb}=118$ is used to look up FIG. 6 to determine that the green light intensity representative value $Si'_{Gb}$ is 92.

Secondly, obtaining the weight value Wi: Vmax is 183 as Vmax is the larger one of 183 ($V_R$) and 158 ($V_{Gb}$). Because Vmax<$V_T$, Wi is 1.

Next, obtaining the monochromatic compensation values f(Si): as $f(S_i)=S_i'*W_i$, the red (R) compensation value is 103, and the green (Gb) compensation value is 92.

Finally, obtaining the image data after compensation: the image data value for the red (R) after compensation is 183−103=80. The image data value for the green (Gb) after compensation is 158−92=66.

Calculation Example II

Secondly, it is assumed that the photo sensors $22_R$, $22_{Gb}$ in the effective region 14 of FIG. 2B are corresponding to the position P2 on the right of FIG. 18. It is assumed that the red (R) light intensity representative value Si corresponding to P2 is 232 ($S_R$), and the green (Gb) light intensity representative value Si corresponding to P2 is 214 ($S_{Gb}$). It can be known from the previous illustration of the second embodiment of Step S86 that, in FIG. 18, between the second position i2 and the third position i3 is a selected interval, and the guard interval is then obtained through joining in Step S860d. Therefore, the photo sensors $22_R$, $22_{Gb}$ at the position P2 are protected and are not compensated. Thus, the actual readings of the photo sensors 22R, 22Gb are the output values of the image data after compensation.

In addition, if the selected intervals of the other three monochromatic light representative value profiles cover the regions to the left of the second position i2 or the right of the third position i3, the protected interval increases accordingly.

Calculation Example III

Thirdly, it is assumed that the photo sensors $22_R$, $22_{Gb}$ in the effective region 14 of FIG. 2B are corresponding to the position P3 on the left of FIG. 18 (that is, located on the dashed line). In FIG. 18, it is assumed that the red (R) light intensity representative value Si corresponding to P1 is 198 ($S_R$), and the green (Gb) light intensity representative value Si corresponding to P1 is 183 ($S_{Gb}$). It is assumed that the monochromatic image intensity value $V_O$ representing the red photo sensor $22_R$ is 216 ($V_R$), while the monochromatic image intensity value $V_O$ representing the green (Gb) photo sensor is 202 ($V_{Gb}$). It is still assumed that FIG. 5 is a schematic curve diagram of the conversion of the red light representative values $S_i$ to the monochromatic compensation values $S_i'$, and FIG. 6 is a schematic curve diagram of the conversion of the green light representative values $S_i$ to the monochromatic compensation values $S_i'$.

Firstly, obtaining the monochromatic light intensity representative values $S_i'$: $S_{R=98}$ is used to look up FIG. 5 to determine that the red light intensity representative value $Si'_R$ is 180. $S_{Gb}=183$ is used to look up FIG. 6 to determine that the green light intensity representative value $Si'_{Gb}$ is 156.

Secondly, obtaining the weight value Wi: Vmax is 216 as Vmax is the larger one of 216 ($V_R$) and 202 ($V_{Gb}$). Because Vmax>$V_T$, Wi is $(V_S-Vmax)/(V_S-V_T)=(255-216)/(255-191)=0.61$.

Subsequently, obtaining the monochromatic compensation values f(Si): as $f(S_i)=S_i'*W_i$, the red (R) compensation value is 180*0.61=110, and the green (Gb) compensation value is 156*0.61=95.

Finally, obtaining the image data after compensation: the image data value for the red (R) after compensation is 216−110=106. The image data value for the green (Gb) after compensation is 202−95=107.

Finally, the inventors provide the result diagrams before and after compensating different scenes by utilizing the method of the present invention (Steps S80, S82, the fourth embodiment of S84, and the second embodiment of S86). Refer to FIGS. 21A, 21B, 22A, 22B, 23A, 23B, 24A and 24B.

Figure 21A:
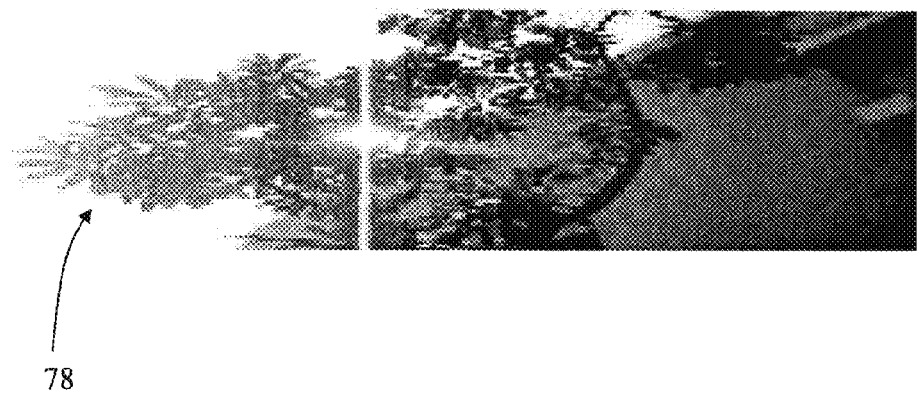
FIGS. 21A and 21B are another schematic comparison view of the image data before and after compensation according to the fourth embodiment of S84 of the present invention respectively.
Figure 21B:

FIG. 21A shows a shot natural landscape from the bottom of a tree to its leaves, in which the sun happens to be in the gap of the leaves. It can be seen from FIG. 21A, in the original image data that is not compensated, all the pixels to the left of the smear line position have the smear effect (in a color image, mark 78 and the sky area to the left have purple fringing obviously). While after the compensation, in FIG. 21B, most parts are not compensated because the image intensity value of the smear line is too large. But except for the positions where the smear effect is relatively strong, the image data to the left of the smear effect are all compensated properly. In particular, the image of the leaves (the position labeled 78 and the sky area at its left side) has a sense of reality without any visual sense of artifact.

Figure 22A:
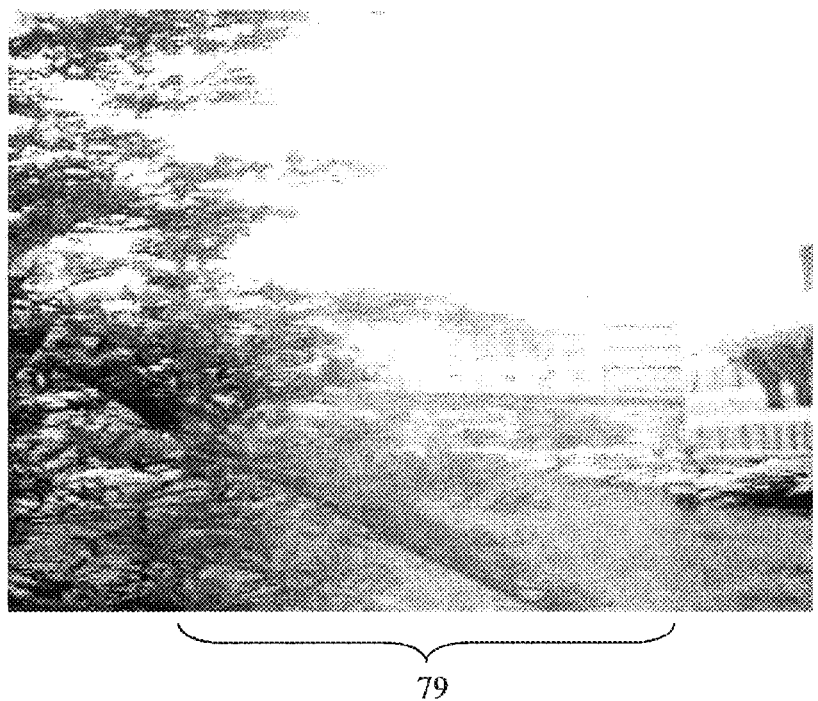
FIGS. 22A and 22B are still another schematic comparison view of the image data before and after compensation according to the fourth embodiment of S84 of the present invention respectively.
Figure 22B:
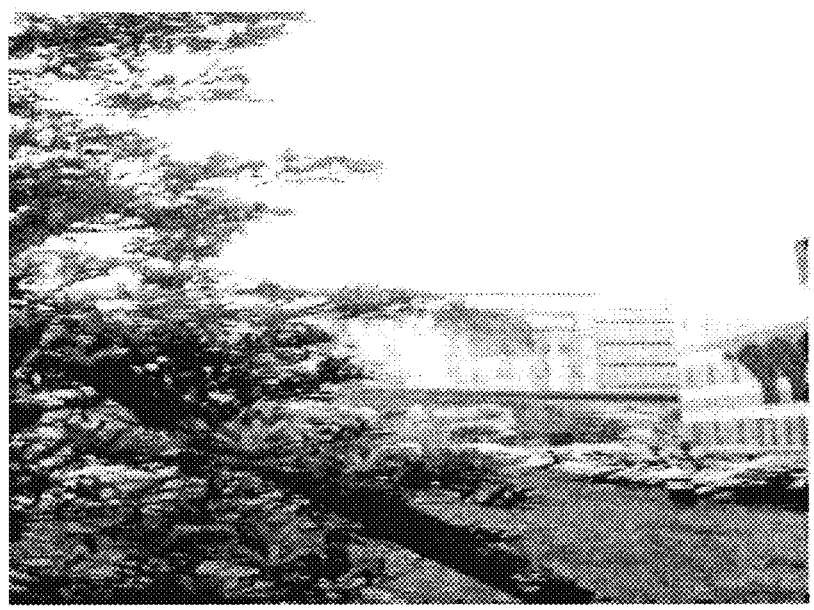

Then, FIG. 22A shows a building shot from behind a tree. It can be seen from FIG. 22A that, the region marked 79 has the smear effect (the whole region is purplized of different degrees). Through the algorithm of the present invention, it can be seen from FIG. 22B, the smear effect in the region marked 79 has been compensated properly, making the entire image data to be rather clear.

Figure 23A:
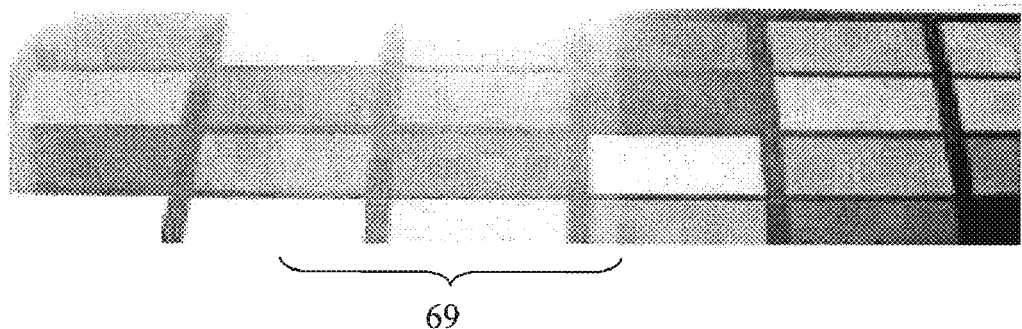
FIGS. 23A and 23B are yet another schematic comparison view of the image data before and after compensation according to the fourth embodiment of the S84 of the present invention respectively.
Figure 23B:
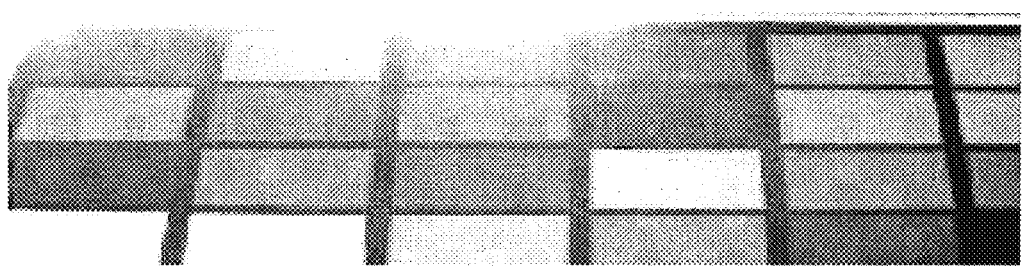

FIG. 23A shows a shot color plate similar to FIG. 7A. It can be seen in FIG. 23A that, the region marked 69 has the smear effect of obvious purplization. Through the compensation of the present invention, it can be seen from FIG. 23B, the smear effect is not observed visually in the image data after compensation. According to the comparison diagrams before and after the compensation, as the color plate has color blocks of various colors, the compensation effect and capability of the present invention to different colors can be tested through the compensation test to the shot scene.

Figure 24A:
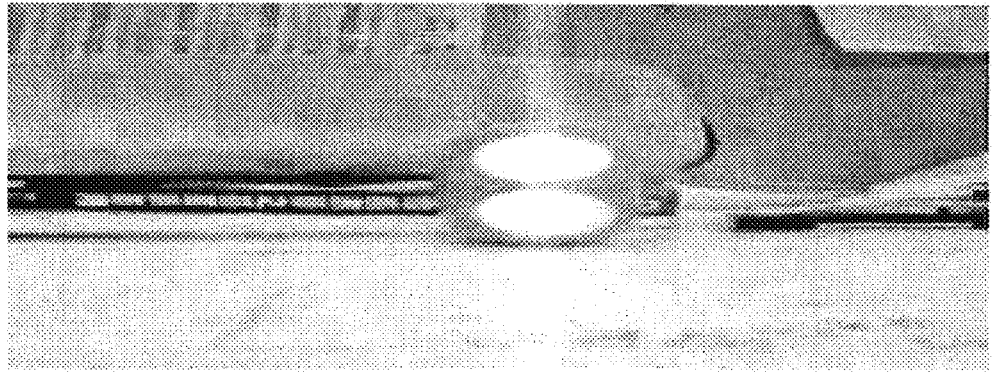
FIGS. 24A and 24B are still yet another schematic comparison view of the image data before and after compensation according to the fourth embodiment of the S84 of the present invention respectively.
Figure 24B:
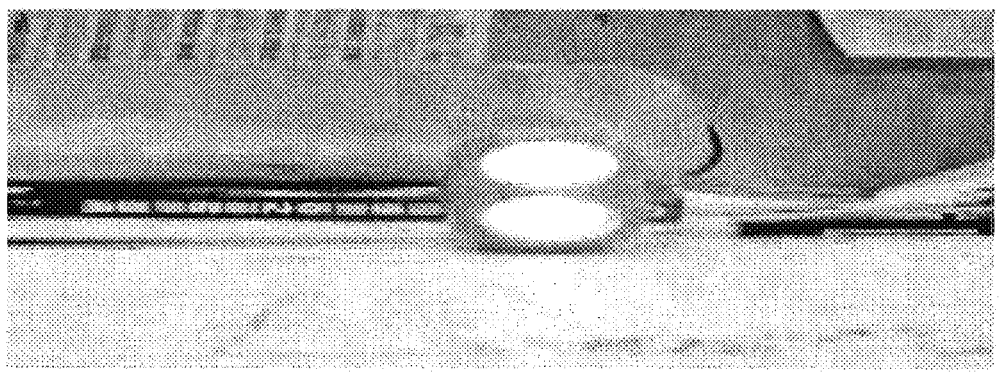

Finally, FIG. 24A shows a scene in which a light fixture (for example, an electric torch) is shot directly. It can be seen from FIG. 24A that an obvious smear line is observed in the vertical direction of the bright object (the light fixture). Through the compensation of the present invention, the smear effect has been removed without any visual sense of artifact.

To sum up, through the method of the present invention, the compensation can be carried out properly regardless whether the shot scene is indoor, outdoor, a landscape, or near objects without artifact, and at the same time, the technical problems of the prior art are solved.

What is claimed is:

1. A method for compensating image data, adapted for an image sensor, wherein the image sensor converts a light transmitted from a scene to image data, and the image sensor has a plurality of photo sensors arranged in an effective region and an optical black region, the method for compensating image data comprising:

extracting a plurality of monochromatic light representative values $S_i$ corresponding to a plurality of pixel positions i from the photo sensors of the optical black region, wherein the monochromatic light representative values $S_i$ are average values of all intensity values of the same monochromatic light corresponding to the same pixel position i in the optical black region;

extracting a plurality of monochromatic image intensity values $V_O$ from the photo sensors of the effective region;

converting the monochromatic light representative values $S_i$ respectively to a plurality of monochromatic compensation values $f(S_i)$, comprising:

obtaining a weight value Wi based on a larger value Vmax in the two monochromatic image intensity values $V_O$ at the same pixel position i in the same Bayer pattern;

obtaining a plurality of adjusted representative values $S_i'$ by looking up the monochromatic light representative values $S_i$ in a look-up table according to a pixel intensity of each of the pixel positions i; and obtaining the monochromatic compensation values $f(S_i)$ by multiplying the adjusted representative values $S_i'$ respectively by the corresponding weight value $W_i$ based on the pixel position I; and outputting compensated image data $V_F$ after compensating the monochromatic image intensity values $V_O$ respectively based on the pixel positions i and the corresponding monochromatic compensation values $f(S_i)$, wherein the photo sensors are provided with a plurality of color filters, the color filters are arranged in a Bayer pattern, and the monochromatic light representative values $S_i$ comprise a red (R) light representative value, two green (Gr, Gb) light representative values, and a blue (B) light representative value.

2. The method for compensating image data according to claim 1, wherein each of the monochromatic compensation values $f(S_i)$ is corresponding to a plurality of the pixel positions i.

3. The method for compensating image data according to claim 2, wherein the step of converting the monochromatic light representative values $S_i$ respectively to the plurality of monochromatic compensation values comprises obtaining the monochromatic compensation values $f(S_i)$ by looking up the monochromatic light representative values $S_i$ in a look-up table according to a pixel intensity of each of the pixel positions i.

4. The method for compensating image data according to claim 3, wherein the monochromatic image intensity values $V_O$ comprise a red (R) image intensity value $V_R$, two green (Gr, Gb) image intensity values $V_{Gr}$, $V_{Gb}$, and a blue (B) image intensity value $V_B$.

5. The method for compensating image data according to claim 1, wherein the step of obtaining the weight value Wi based on the larger value Vmax in the two monochromatic image intensity values $V_O$ of the same pixel position i in the same Bayer pattern comprises:

when the larger value Vmax is smaller than a first predetermined value ($V_T$), the weight value $W_i$ being equal to 1; otherwise, the weight value $W_i$ being to ($V_S$–Vmax)/($V_S$–$V_T$), wherein $V_S$ is a maximum extracted value when the photo sensor is saturated.

6. The method for compensating image data according to claim 5, wherein the two monochromatic image intensity values $V_O$ of the same pixel position i in the same Bayer pattern are the red image intensity value $V_R$ and one of the green image intensity values $V_{Gb}$, or the other of the green image intensity values $V_{Gr}$ and the blue image intensity value $V_B$.

7. The method for compensating image data according to claim 5, wherein the step of outputting the compensated image data $V_F$ after compensating the monochromatic image intensity values $V_O$ respectively based on the pixel positions i and the corresponding monochromatic compensation values $f(S_i)$ comprises:

determining a guard interval of the pixel positions i based on each of the monochromatic light representative values $S_i$; and except for the pixel positions in the guard interval, outputting the compensated image data $V_F$ after compensating the monochromatic image intensity values $V_O$ respectively based on the pixel positions i and the corresponding monochromatic compensation values $f(S_i)$.

8. The method for compensating image data according to claim 7, wherein the step of determining the guard interval of the pixel positions i based on each of the monochromatic light representative values $S_i$ comprises:

selecting one of four monochromatic light representative value profiles in sequence in the same Bayer pattern, when the monochromatic light representative value $S_i$ of the selected monochromatic light representative value profile is greater than a second predetermined value, recording the pixel position thereof as a first position;

in the same selected monochromatic light representative value profile, determining whether the monochromatic light representative values $S_i$ adjacent to the first position are smaller than a third predetermined value in sequence;

in the same selected monochromatic light representative value profile, when the monochromatic light representative values $S_i$ are smaller than the third predetermined value, recording the pixel positions thereof as a second position and a third position, wherein between the second position and the third position is a monochromatic light selected interval; and joining the monochromatic light selected intervals to obtain the guard interval.

9. The method for compensating image data according to claim 8, wherein the step of determining whether the monochromatic light representative values $S_i$ adjacent to the first position are smaller than the third predetermined value in sequence comprises determining whether the monochromatic light representative values $S_i$ at the adjacent pixel positions greater than the first position or smaller than the first position are smaller than the third predetermined value.

10. The method for compensating image data according to claim 8, wherein the third predetermined value is smaller than the second predetermined value.

11. The method for compensating image data according to claim 1, wherein the step of outputting the compensated image data $V_F$ after compensating the monochromatic image intensity values $V_O$ respectively based on the pixel positions i and the corresponding monochromatic compensation values $f(S_i)$ comprises subtracting the monochromatic compensation values $f(S_i)$ from the monochromatic image intensity values $V_O$ corresponding to the pixel positions i to obtain the compensated image data $V_F$.

12. A method for compensating image data, adapted for an image sensor, wherein the image sensor converts a light transmitted from a scene to image data, and the image sensor has a plurality of photo sensors arranged in an effective region and an optical black region, the method for compensating image data comprising:

extracting a plurality of monochromatic light representative values $S_i$ corresponding to a plurality of pixel positions i from the photo sensors of the optical black region;

extracting a plurality of monochromatic image intensity values $V_O$ from the photo sensors of the effective region;

converting the monochromatic light representative values $S_i$ respectively to a plurality of monochromatic compensation values $f(S_i)$, comprising:

obtaining a weight value $W_i$ based on the monochromatic image intensity values $V_O$; and obtaining a plurality of adjusted representative values $S_i'$ by looking up the monochromatic light representative values $S_i$ individually or the monochromatic light representative values $S_i$ in a look-up table according to a pixel intensity of each of the pixel positions i based on the pixel position i, and obtaining the monochromatic compensation values $f(S_i)$ by multiplying the adjusted representative values $S_i'$ by the corresponding weight value $W_i$; and outputting compensated image data $V_F$ after compensating the monochromatic image intensity values $V_O$ respectively based on the pixel positions i and the corresponding monochromatic compensation values $f(S_i)$.

13. The method for compensating image data according to claim 12, wherein the step of obtaining the weight value $W_i$ based on the monochromatic image intensity values $V_O$ comprises:

when the monochromatic image intensity values $V_O$ are smaller than a first predetermined value ($V_T$), the weight value $W_i$ being equal to 1; otherwise, the weight value $W_i$ being equal to $(V_S-V_O)/(V_S-V_T)$, wherein $V_S$ is a maximum extracted value when the photo sensor is saturated.

14. A method for compensating image data, adapted for an image sensor, wherein the image sensor converts a light transmitted from a scene to image data, and the image sensor has a plurality of photo sensors arranged in an effective region and an optical black region, the method for compensating image data comprising:

extracting a plurality of monochromatic light representative values $S_i$ corresponding to a plurality of pixel positions i from the photo sensors of the optical black region;

extracting a plurality of monochromatic image intensity values $V_O$ from the photo sensors of the effective region;

converting the monochromatic light representative values $S_i$ respectively to a plurality of monochromatic compensation values $f(S_i)$, comprising:

obtaining a weight value $W_i$ based on the monochromatic image intensity values $V_O$, wherein when the monochromatic image intensity values $V_O$ are smaller than a first predetermined value ($V_T$), the weight value $W_i$ is equal to 1; otherwise, the weight value $W_i$ is equal to $(V_S-V_O)/(V_S-V_T)$, wherein $V_S$ is a maximum extracted value when the photo sensor is saturated;

obtaining a plurality of adjusted representative values $S_i'$ by looking up the monochromatic light representative values $S_i$ in a look-up table according to a pixel intensity of each of the pixel positions i; and obtaining the monochromatic compensation values $f(S_i)$ by multiplying the adjusted monochromatic light representative values $S_i'$ respectively by the corresponding weight value $W_i$ based on the pixel position i; and outputting compensated image data $V_F$ after compensating the monochromatic image intensity values $V_O$ respectively based on the pixel positions i and the corresponding monochromatic compensation values $f(S_i)$, comprising:

determining a guard interval of the pixel positions i based on each of the monochromatic light representative values $S_i$; and except for the pixel positions in the guard interval, outputting the compensated image data $V_F$ after compensating the monochromatic image intensity values $V_O$ respectively based on the pixel positions i and the corresponding monochromatic compensation values $f(S_i)$.

* * * * *